(12) United States Patent
Vishin et al.

(10) Patent No.: US 7,594,089 B2
(45) Date of Patent: Sep. 22, 2009

(54) SMART MEMORY BASED SYNCHRONIZATION CONTROLLER FOR A MULTI-THREADED MULTIPROCESSOR SOC

(75) Inventors: Sanjay Vishin, Sunnyvale, CA (US); Kevin D. Kissell, Le Bar sur Loup (FR); Darren M. Jones, Los Altos, CA (US); Ryan C. Kinter, Los Altos, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 21 days.

(21) Appl. No.: 10/955,231

(22) Filed: Sep. 30, 2004

(65) Prior Publication Data

US 2005/0251639 A1 Nov. 10, 2005

Related U.S. Application Data

(63) Continuation-in-part of application No. 10/929,097, filed on Aug. 27, 2004, which is a continuation-in-part of application No. 10/928,746, filed on Aug. 27, 2004, which is a continuation-in-part of application No. 10/929,102, filed on Aug. 27, 2004, which is a continuation-in-part of application No. 10/929,342, filed on Aug. 27, 2004, which is a continuation-in-part of application No. 10/684,350, filed on Oct. 10, 2003, which is a continuation-in-part of application No. 10/684,348, filed on Oct. 10, 2003.

(60) Provisional application No. 60/502,359, filed on Sep. 12, 2003, provisional application No. 60/502,358, filed on Sep. 12, 2003, provisional application No. 60/499,180, filed on Aug. 28, 2003.

(51) Int. Cl.
*G06F 12/00* (2006.01)
*G06F 13/00* (2006.01)
*G06F 13/28* (2006.01)

(52) U.S. Cl. .................. 711/168; 711/154; 711/156; 711/158; 711/167

(58) Field of Classification Search .............. 711/154, 711/156, 158, 167, 168
See application file for complete search history.

(56) References Cited

U.S. PATENT DOCUMENTS 4,817,051 A 3/1989 Chang
(Continued)

FOREIGN PATENT DOCUMENTS

EP 0725334 A1 8/1996
(Continued)

OTHER PUBLICATIONS

Culler, David, Two Fundamental Limits on Dataflow Multiprocessing, 1993, University of California, Berkely, 14 pages.*

(Continued)

*Primary Examiner*—Hyung S Sough
*Assistant Examiner*—Gary W. Cygiel
(74) *Attorney, Agent, or Firm*—Sterne, Kessler, Goldstein & Fox PLLC

(57) ABSTRACT

A memory interface for use with a multiprocess memory system having a gating memory, the gating memory associating one or more memory access methods with each of a plurality of memory locations of the memory system wherein the gating memory returns a particular one access method for a particular one memory location responsive to a memory access instruction relating to the particular one memory location, the interface including: a request storage for storing a plurality of concurrent memory access instructions for one or more of the particular memory locations, each the memory access instruction issued from an associated independent thread context; an arbiter, coupled to the request storage, for selecting a particular one of the memory access instructions to apply to the gating memory; and a controller, coupled to the request storage and to the arbiter, for: storing the plurality of memory access instructions in the request storage; initiating application of the particular one memory access instruction selected by the arbiter to the gating memory; receiving the particular one access method associated with the particular one memory access method from the gating memory; and initiating a communication of the particular access method to the thread context associated with the particular one access instruction.

69 Claims, 2 Drawing Sheets

U.S. PATENT DOCUMENTS

| | | | |
|---|---|---|---|
| 4,860,190 | A | 8/1989 | Kaneda et al. |
| 5,159,686 | A | 10/1992 | Chastain et al. |
| 5,499,349 | A | 3/1996 | Nikhil et al. |
| 5,511,192 | A | 4/1996 | Shirakihara |
| 5,515,538 | A | 5/1996 | Kleiman |
| 5,659,786 | A | 8/1997 | George et al. |
| 5,758,142 | A | 5/1998 | McFarling et al. |
| 5,799,188 | A | 8/1998 | Manikundalam et al. |
| 5,812,811 | A | 9/1998 | Dubey et al. |
| 5,867,704 | A | 2/1999 | Tanaka et al. |
| 5,892,934 | A | 4/1999 | Yard |
| 5,933,627 | A * | 8/1999 | Parady ................. 712/228 |
| 5,944,816 | A | 8/1999 | Dutton et al. |
| 5,949,994 | A | 9/1999 | Dupree et al. |
| 5,961,584 | A | 10/1999 | Wolf |
| 6,061,710 | A | 5/2000 | Eickemeyer et al. |
| 6,088,787 | A | 7/2000 | Predko |
| 6,128,720 | A | 10/2000 | Pechanek et al. |
| 6,175,916 | B1 | 1/2001 | Ginsberg et al. |
| 6,189,093 | B1 | 2/2001 | Ekner et al. |
| 6,205,543 | B1 | 3/2001 | Tremblay et al. |
| 6,223,228 | B1 | 4/2001 | Ryan et al. |
| 6,286,027 | B1 | 9/2001 | Dwyer, III et al. |
| 6,330,656 | B1 | 12/2001 | Bealkowski et al. |
| 6,330,661 | B1 | 12/2001 | Torii |
| 6,401,155 | B1 | 6/2002 | Saville et al. |
| 6,591,379 | B1 * | 7/2003 | LeVine et al. ............. 714/38 |
| 6,643,759 | B2 | 11/2003 | Andersson et al. |
| 6,668,308 | B2 | 12/2003 | Barroso et al. |
| 6,671,791 | B1 | 12/2003 | McGrath |
| 6,675,192 | B2 | 1/2004 | Emer et al. |
| 6,687,812 | B1 | 2/2004 | Shimada |
| 6,697,935 | B1 * | 2/2004 | Borkenhagen et al. ...... 712/228 |
| 6,738,796 | B1 | 5/2004 | Mobini |
| 6,779,065 | B2 | 8/2004 | Murty et al. |
| 6,877,083 | B2 | 4/2005 | Arimilli et al. |
| 6,889,319 | B1 | 5/2005 | Rodgers et al. |
| 6,920,634 | B1 * | 7/2005 | Tudor ................. 718/107 |
| 6,922,745 | B2 * | 7/2005 | Kumar et al. ............. 710/200 |
| 6,971,103 | B2 * | 11/2005 | Hokenek et al. ............ 718/107 |
| 6,986,140 | B2 * | 1/2006 | Brenner et al. ............. 718/105 |
| 6,993,598 | B2 * | 1/2006 | Pafumi et al. ................. 710/24 |
| 7,020,879 | B1 | 3/2006 | Nemirovsky et al. |
| 7,065,094 | B2 | 6/2006 | Petersen et al. |
| 7,069,421 | B1 | 6/2006 | Yates, Jr. et al. |
| 7,073,042 | B2 | 7/2006 | Uhlig et al. |
| 7,093,106 | B2 | 8/2006 | Ambekar et al. |
| 7,127,561 | B2 | 10/2006 | Hill et al. |
| 7,134,124 | B2 | 11/2006 | Ohsawa et al. |
| 7,152,170 | B2 | 12/2006 | Park |
| 7,181,600 | B1 | 2/2007 | Uhler |
| 7,185,183 | B1 | 2/2007 | Uhler |
| 7,185,185 | B2 | 2/2007 | Joy et al. |
| 7,203,823 | B2 | 4/2007 | Albuz et al. |
| 7,216,338 | B2 | 5/2007 | Barnett et al. |
| 7,321,965 | B2 | 1/2008 | Kissell |
| 7,376,954 | B2 | 5/2008 | Kissell |
| 7,424,599 | B2 | 9/2008 | Kissell |
| 7,428,732 | B2 | 9/2008 | Sandri et al. |
| 2002/0083173 | A1 | 6/2002 | Musoll et al. |
| 2002/0083278 | A1 * | 6/2002 | Noyes .................. 711/156 |
| 2002/0091915 | A1 | 7/2002 | Parady |
| 2002/0103847 | A1 | 8/2002 | Potash |
| 2002/0147760 | A1 | 10/2002 | Toril |
| 2002/0174318 | A1 | 11/2002 | Stuttard et al. |
| 2003/0014471 | A1 | 1/2003 | Ohsawa et al. |
| 2003/0074545 | A1 | 4/2003 | Uhler |
| 2003/0079094 | A1 * | 4/2003 | Rajwar et al. ............. 711/150 |
| 2003/0093652 | A1 | 5/2003 | Song |
| 2003/0105796 | A1 | 6/2003 | Sandri et al. |
| 2003/0115245 | A1 | 6/2003 | Fujisawa |
| 2003/0126416 | A1 | 7/2003 | Marr et al. |
| 2003/0225816 | A1 | 12/2003 | Morrow et al. |
| 2004/0015684 | A1 | 1/2004 | Peterson |
| 2004/0139306 | A1 | 7/2004 | Albuz et al. |
| 2005/0050305 | A1 | 3/2005 | Kissell |
| 2005/0050395 | A1 | 3/2005 | Kissell |
| 2005/0120194 | A1 | 6/2005 | Kissell |
| 2005/0125629 | A1 | 6/2005 | Kissell |
| 2005/0125795 | A1 | 6/2005 | Kissell |
| 2005/0240936 | A1 | 10/2005 | Jones et al. |
| 2005/0251613 | A1 | 11/2005 | Kissell |
| 2006/0161421 | A1 | 7/2006 | Kissell |
| 2006/0161921 | A1 | 7/2006 | Kissell |
| 2006/0190945 | A1 | 8/2006 | Kissell |
| 2006/0190946 | A1 | 8/2006 | Kissell |
| 2006/0195683 | A1 | 8/2006 | Kissell |
| 2006/0206686 | A1 | 9/2006 | Banerjee et al. |
| 2007/0043935 | A2 | 2/2007 | Kissell |
| 2007/0044105 | A2 | 2/2007 | Kissell |
| 2007/0044106 | A2 | 2/2007 | Kissell |
| 2007/0106887 | A1 | 5/2007 | Kissell |
| 2007/0106988 | A1 | 5/2007 | Kissell |
| 2007/0106989 | A1 | 5/2007 | Kissell |
| 2007/0106990 | A1 | 5/2007 | Kissell |
| 2007/0186028 | A2 | 8/2007 | Kissell |
| 2008/0140998 | A1 | 6/2008 | Kissell |

FOREIGN PATENT DOCUMENTS

| | | |
|---|---|---|
| EP | 0917057 A2 | 5/1999 |
| EP | 1089173 A2 | 4/2001 |
| JP | 8-249195 A | 9/1996 |
| JP | 2007-504536 | 3/2007 |
| WO | WO0153935 A1 | 7/2001 |
| WO | WO 03/019360 A2 | 3/2003 |
| WO | WO 2005/022385 A1 | 3/2005 |

OTHER PUBLICATIONS

Kisssell, Kevin D., "Microprocessor Forum (MPF) Conference Program Presentation: Architectural Extensions to the MIPS Architecture for High-Performance Embedded Systems" Oct. 15, 2003.

Ungerer, Theo, et. al., "A Survey of Processors with Explicit Multithreading" ACM Computing Surveys, vol. 35, No. 1, Mar. 2003, pp. 29-63.

(Webpage) Cray MTA-2 Historical Technical Papers, http://www.cray.com/products/programs/mta_2/resources.html (Mar. 12, 2005), (formerly http://www.cray.com/products/systems/mta/psdocs.html (Jul. 2, 2004)).

Carter, Larry, et al., "Performance and Programming Experience on the Tera MTA," SIAM Conference on Parallel Processing, Mar. 1999.

Zaslavsky, Leonid, et. al., "A Scalable Approach for Solving Irregular Sparse Linear Systems on the Tera MTA Multithreaded Parallel Shared-Memory," Ninth SIAM Conference on Parallel Processing for Scientific Computing, San Antonio, TX, Mar. 1999.

Smith, Burton, "From Here to Petaflops, "Keynote Address, Petaflops-systems Operations Working Review, (POWR), Bodega Bay, California, Jun. 1998.

Briggs, Preston, "Tuning the BLAS for the Tera," Workshop on Multithreaded Execution, Architecture and Compilation, (MTEAC 98), Jan. 1998.

Alverson, Gail, et. al., "Tera Hardware-Software Cooperation," Supercomputing 1997, Nov. 1997.

Alverson, Gail, et. al., "Scheduling on the Tera MTA." IPPS '95 Workshop on Job Scheduling Strategies for Parallel Processing, Santa Barbara, CA, Apr. 1995, and in D.G. Feitelson and L. Rudolph, editors, Job Scheduling Strategies for Parallel Processiong, Lecture Notes in Computer Science vol. 949, pp. 19-44, Springer-Verlag, 1995.

Smith, Burton, "Folklore and Reality in High Performance Computing Slide Presentation," 1995.

Smith, Buron, "The Quest for General-Purpose Parallel Computing," 1994.

Alverson, Gail, et. al., "Exploiting Heterogeneous Parallelism on a Multithreaded Multiprocessor," 6th ACM International Conference on Supercomputing, Washington, DC, Jul. 1992.

Callahan, David, "Recognizing and Parallelizing Bounded Recurrences," Fourth Workshop on Languages and Compilers for Parallel Computing, pp. 169-184, Aug. 1991.

Callahan, David, et. al., "Register Allocation via Hierarchical Graph Coloring," ACM SIGPLAN '91 Conference on Programming Language Design and Implementation, Jun. 1991.

Alverson, Robert, "Integer Division Using Reciprocals," 10th IEEE Symposium on Computer Arithmetic, Jun. 1991.

Callahan, David, et. al., "Improving Register Allocation for Subscripted Variables," ACM SIGPLAN Conference on Programming Language Design and Implementation, Jun. 1990.

Alverson, Robert, et. al., "The Tera Computer System," ACM International Conference on Supercomputing, pp. 1-6, Jun. 1990.

Smith, Burton, "The End of Architecture," Keynote Address, 17th Annual Symposium on Computer Architecture, Seattle, Washington, May 1990.

Alverson, Gail, et. al., "A Future-Based Parallel Language for a General Purpose Highly Parallel Computer," Languages and Compilers for Parallel Computing, pp. 95-113, MIT Press, Cambridge, Massachusetts, 1990.

Engelshall, R.S., "pth GNU Portable Threads," PTH Manual, 'Online! Feb. 17, 2003, pp. 1-31 Retrieved from the Internet: URL:web.archive.org/web/20030318064847/http://www.gnu.org/software/pth/pth-manual.ps (Retrieved on Jan. 31, 2005).

Ishihara, T, et. al., "A Comparison of Concurrent Programming and Cooperative Multithreading," Euro-Par 200 Parallel Processing. 6th International Euro-Par Converence. Proceedings (Lecture Notes in Computer Science vol. 1900) Springer-Verlag Berlin, Germany, Sep. 1, 2000, pp. 729-738 (ISBN: 3-540-67956-1.

Frees, W., "Teilzeitareit Im Prozessor." Elektronik, Franzis Verlag GMBH, Munchen, DE, vol. 45, No. 9, Apr. 30, 1996 pp. 100-106, ISSN: 0013-5658.

"MIT Alewife Project: Home Page," retrieved from URL:catfish.csail.mit.edu/alewife/ on Jul. 2, 2004.

Arvind and R.A. Innaucci, "Two Fundamental Issues in Multiprocessing," In Proc. of DFVLR-Conf. 1987 on Par. Proc. in Science and Eng., Bonn-Bad Godesberg, W. Germany, Jun. 1987.

Fotland, David. A Multithreaded Wireless Network Processor with Software I/O. Embedded Processor Forum. Jun. 18, 2003. In-State MDR;www.MDRonline.com.

Marr et al. Hyper-Threading Technology. Intel Technology Journal, Feb. 14, 2002, vol. 6, No. 1, Intel Corporation, USA.

Sunsoft. Multithreaded Programming Guide. 1995. Sunsoft, A Sun Microsystems, Inc. Business. Mountainview, CA.

Scheidhauer, Ralf, "Design, Implementierung und Evaluierung einer virtuellen Maschine fur Oz," Online!, Dec. 1998, Dissertation, Saarbrucken, (English-language version of the search report or action which indicates the degree of relevance found by the foreign office is appended.).

Mehl et al., "An Abstract Machine for Oz," Research Report RR-95-08, Online!, Jun. 1995, pp. 1-23, Kaiserslautern Saarbrucken, ISSN 0946-008.

Ungerer et al., "Utilising Parallel Resources By Speculation," Parallel and Distributed Processing, 1999: PDP '99. Proceedings of the Seventh Euromicro Workshop on Funchal, Portugal Feb. 3-5, 1999, Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compiliation Techniques, 1996, Proceedings of the 1996 Conference in Boston, MA, USA, Oct. 20-23, 1996, Los Alamitos, CA, USA, IEEE Comput. Soc., Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

UBICOM, Inc. A Next Generation Packet Processor for Wireless Networking. Apr. 15, 2003. UBICOM, Inc. Mountain View, CA, USA.

Bolychevsky et al. "Dynamic Scheduling in RISC Architectures." IEEE Proceedings Computers and Digital Techniques, vol. 143, No. 5. Sep. 24, 1996. pp. 309-317.

Heuring, Vincent P. and Jordan, Harry F. "Computer Systems and Architecture." Reading, Mass.: Addison Wesley Longman, Inc., © 1997. pp. 35-37.

Patterson et al. "Computer Organization & Design: The Hardware/Software Interface." 1998. Morgan Kaufmann Publishers, Inc. Second Edition. pp. 592-593.

Silberschatz et al. "Operating Systems Concepts." 1994. Addison-Wesley Publishing Company. Fourth Edition, pp. 267-269, 271-272, 275.

Sunsoft. Multithreaded Programming Guide. 1995. Sunsoft, A Sun Microsystems, Inc. Business. Mountainview, CA.

Sunsoft. Multithreaded Programming Guide. 1994. Sunsoft, A Sun Microsystems, Inc. Business. Mountainview, CA. pp. 6, 12-13, 22-34 and 87.

Hennessy, John L. et al. "Computer Architecture A Quantitative Approach." Second Edition. San Francisco, CA: Morgan Kaufmann Publishers, Inc. 1996. pp. 70-73 and 87-89.

Zilles, Craig B. et al. "The Use of Multithreading for Exception Handling." *micro*, p. 219. 32nd Annual International Symposium on Microarchitecture.

Dorai, Gautham K. et al. "Transparent Threads: Resource Sharing in SMT Processors for High Single-Thread Performance." Proceedings of the International Conference on Parallel Architectures and Compilaiton Techniques 2002.

MIPS32™ Architecture For Programmers vol. II The MIPS32™ Instruction Set. Revision 2.00. pp. 231 & 311. Document No. MD00086. Jun. 9, 2003. MIPS Technologies, Inc.

Thiébaut, Dominique et al., *Improving Disk Cache Hit-Ratios Through Cache Partitioning*, IEEE Transactions on Computers, vol. 41, No. 6 (1992), pp. 665-676.

Sweetman, Dominic, *See MIPS Run*, Morgan Kaufmann Publishers, San Francisco, CA (2002). (entire book submitted).

Free On-Line Dictionary of Computing, ©2004, search term: exception handler, http://foldoc.org/index.cgi?query=exception+handler, downloaded on Dec. 5, 2008, 1 page.

Agarwal, A. et al., "APRIL: a Processor Architecture for Multiprocessing," ACM SIGARCH Computer Architecture News, AMC, vol. 18, Issue 3a, pp. 104-114, Jun. 1990.

English Translation of Notice of Rejection for Japanese Patent Application No. 2006-524900, dated Nov. 28, 2008, 4 pages.

English Translation of Notice of Rejection for Japanese Patent Application No. 2006-524929, dated Nov. 28, 2008, 4 pages.

English Translation of Notice of Rejection for Japanese Patent Application No. 2006-524961, dated Nov. 28, 2008, 3 pages.

English Abstract of Japanese Patent Publication No. 2007-504536, published Mar. 1, 2007, 1 page.

English Abstract of Japanese Patent Publication No. 8-249195, published Sep. 27, 1996, 1 page.

Kane, G. And Heinrich, J., *MIPS RISC Architecture*, Prentice Hall, Upper Saddle River, New Jersey (1992). (entire book submitted).

Kissell, K.D., *MIPS MT: A Multithreaded RISC Architecture for Embedded Real-Time Processing*, "High Performance Embedded Architectures and Compilers," Spring, vol. 4917/2008, pp. 9-21, 2008.

Kwak, H. et al., "Effects of Multithreading on Cache Performance," Computers, IEEE Transaction on, IEEE, vol. 48, Issue 2, pp. 176-184, Feb., 1999.

Lee, B. et al., "Simulation Study of Multithreaded Virtual Processor," IASTED International Conference on Parallel and Distributed Systems (Euro-PDS), pp. 1-6, Jul. 3, 1998.

MIPS32® Architecture for Programmers, vol. III: The MIPS32® Privileged Resource Architecture, Revision 2.50, Jul. 1, 2005, MIPS Technologies, Inc., 137 pages.

MIPS32® Architecture for Programmers, vol. IV-f: The MIPS® MT ApplicationSpecific Extension to the MIPS32® Architecture, Revision 1.00, Sep. 28, 2005, MIPS Technologies, Inc., 83 pages.

Teller et al., Locating Multiprocessor TLBs at Memory, IEEE, Proc. of the Twenty-Seventh Annual Hawaii International Conference on System Sciences, 1994, pp. 554-563.

* cited by examiner

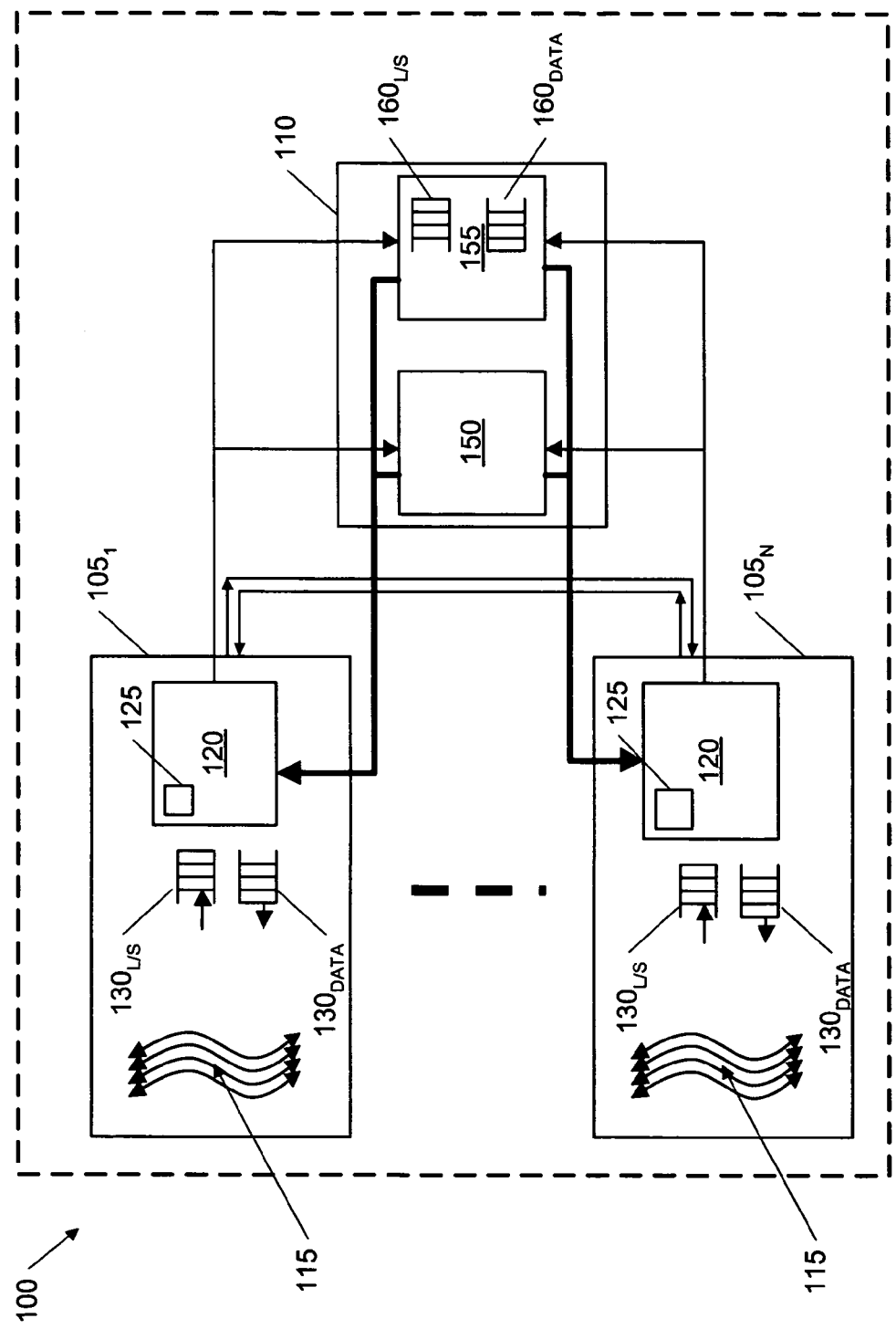
FIGURE_1

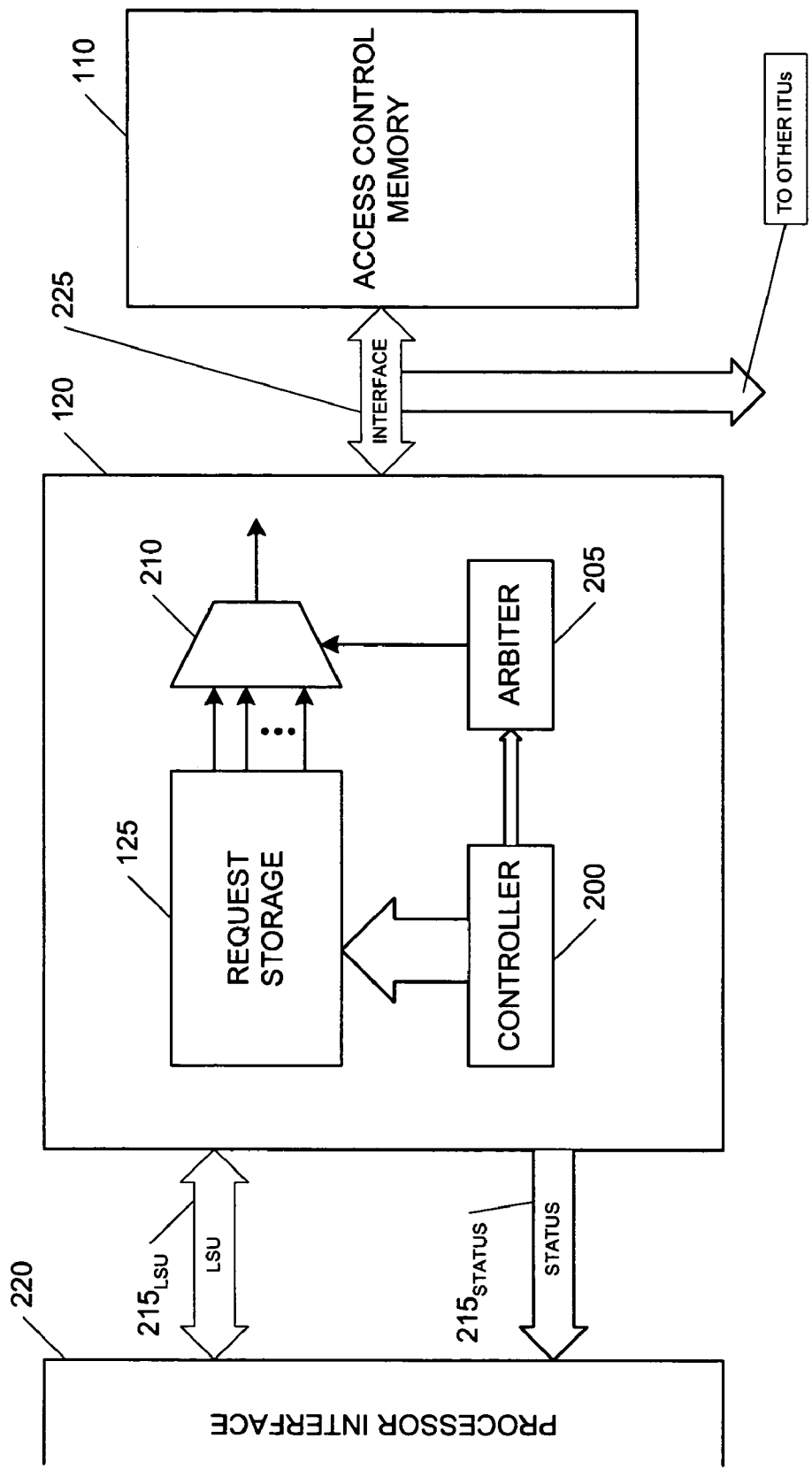
FIGURE_2

SMART MEMORY BASED SYNCHRONIZATION CONTROLLER FOR A MULTI-THREADED MULTIPROCESSOR SOC

CROSS REFERENCE TO RELATED APPLICATIONS

This application is a continuation-in-part (CIP) of the following co-pending Non-Provisional U.S. Patent Applications, which are hereby expressly incorporated by reference in their entireties for all purposes:

| Serial No. | Filing Date | Title |
|---|---|---|
| 10/929,342 | 27 Aug. 2004 | INTEGRATED MECHANISM FOR SUSPENSION AND DEALLOCATION OF COMPUTATIONAL THREADS OF EXECUTION IN A PROCESSOR |
| 10/929,102 | 27 Aug. 2004 | MECHANISMS FOR DYNAMIC CONFIGURATION OF VIRTUAL PROCESSOR RESOURCES |
| 10/928,746 | 27 Aug. 2004 | IMPROVED MECHANISM FOR INITIATION OF CONCURRENT INSTRUCTION STREAMS |
| 10/929,097 | 27 Aug. 2004 | MECHANISMS FOR SOFTWARE MANAGEMENT OF MULTIPLE COMPUTATIONAL CONTEXTS |

This application is a continuation-in-part (CIP) of the following co-pending Non-Provisional U.S. patent applications, which are hereby expressly incorporated by reference in their entireties for all purposes:

| Serial No. | Filing Date | Title |
|---|---|---|
| 10/684,350 | 10 Oct. 2003 | MECHANISMS FOR ASSURING QUALITY OF SERVICE FOR PROGRAMS EXECUTING ON A MULTITHREADED PROCESSOR |
| 10/684,348 | 10 Oct. 2003 | INTEGRATED MECHANISM FOR SUSPENSION AND DEALLOCATION OF COMPUTATIONAL THREADS OF EXECUTION IN A PROCESSOR |

Each of the applications identified in Paragraph [001] is a continuation-in-part (CIP) of each of the following co-pending Non-Provisional U.S. patent applications, which are hereby expressly incorporated by reference in their entireties for all purposes:

| Serial No. | Filing Date | Title |
|---|---|---|
| 10/684,350 | 10 Oct. 2003 | MECHANISMS FOR ASSURING QUALITY OF SERVICE FOR PROGRAMS EXECUTING ON A MULTITHREADED PROCESSOR |
| 10/684,348 | 10 Oct. 2003 | INTEGRATED MECHANISM FOR SUSPENSION AND DEALLOCATION OF COMPUTATIONAL THREADS OF EXECUTION IN A PROCESSOR |

Each of the co-pending Non-Provisional U.S. patent applications identified in Paragraph [001] and Paragraph [002] above claim the benefit of the following U.S. Provisional Applications, which are hereby expressly incorporated by reference in their entireties for all purposes:

| Serial No. | Filing Date | Title |
|---|---|---|
| 60/499,180 | 28 Aug. 2003 | MULTITHREADING APPLICATION SPECIFIC EXTENSION |
| 60/502,358 | 12 Sep. 2003 | MULTITHREADING APPLICATION SPECIFIC EXTENSION TO A PROCESSOR ARCHITECTURE |
| 60/502,359 | 12 Sep. 2003 | MULTITHREADING APPLICATION SPECIFIC EXTENSION TO A PROCESSOR ARCHITECTURE |

This application is related to the following Non-Provisional U.S. patent applications:

| Serial No. (Client Ref.) | Filing Date | Title |
|---|---|---|
| TBD 20031-7001 | 30 Sep. 2004 | SYNCHRONIZED STORAGE PROVIDING MULTIPLE SYNCHRONIZATION SEMANTICS |

All of the above-referenced related patent applications and priority patent applications are hereby expressly incorporated by reference in their entireties for all purposes.

FIELD OF THE INVENTION

The invention relates generally to multiprocessing systems and more specifically to multiple thread synchronization activities on one or more processing elements (real, virtual, or otherwise).

BACKGROUND OF THE INVENTION

Multiprocessing systems continue to become increasingly important in computing systems for many applications, including general purpose processing systems and embedded control systems. In the design of such multiprocessing systems, an important architectural consideration is scalability. In other words, as more hardware resources are added to a particular implementation the machine should produce higher performance. Not only do embedded implementations require increased processing power, many also require the seemingly contradictory attribute of providing low power consumption. In the context of these requirements, particularly for the embedded market, solutions are implemented as "Systems on Chip" or "SoC." The assignee of the present application, MIPS Technologies, Inc., offers a broad range of solutions for such SoC multiprocessing systems.

In multiprocessing systems, loss in scaling efficiency may be attributed to many different issues, including long memory latencies and waits due to synchronization. The present invention addresses improvements to synchronization among threads in a multithreaded multiprocessing environment, particularly when individual threads may be active on one or more multiple processors, on a single processor but distributed among multiple thread contexts, or resident in memory (virtualized threads).

Synchronization in a multithreaded system refers to the activities and functions of such a multiplicity of threads that coordinate use of shared system resources (e.g., system memory and interface FIFOs) through variables storing "state" bits for producer/consumer communication and mutual exclusion (MUTEX) tasks. Important considerations for implementing any particular synchronization paradigm include designing and implementing structures and processes that provide for deadlock-free operation while being very efficient in terms of time, system resources, and other performance measurements.

Synchronization of processes using software and hardware protocols is a well-known problem, producing a wide range of solutions appropriate in different circumstances. Fundamentally, synchronization addresses potential issues that may occur when concurrent processes have access to shared data. As an aid in understanding, the following definitions are provided:

Critical Section—A section of code that reads/writes shared data;

Race Condition—Potential for interleaved execution of a critical section by multiple threads, resulting in non-deterministic behavior;

Semaphore—High-level synchronization mechanism to avoid race conditions and to provide for orderly transfer of shared data between threads;

Mutual Exclusion (MUTEX)—Also a synchronization mechanism to avoid race conditions by ensuring exclusive execution of critical sections; a MUTEX is a binary semaphore;

Deadlock—Permanent blocking of threads; and

Starvation—Execution with insignificant and unfair progress.

Conventional implementations of a MUTEX include software reservation, spin-locks and operating system based mechanisms. Software reservation includes registration of a thread having an intent to enter a critical section, with the thread waiting until assured that no other thread has registered a similar intention. Spin-locks use memory-interlocked instructions that require special hardware to ensure that a given shared resource may be accessed (e.g., a memory location can be read, modified and written with interruption). Operating system mechanisms for MUTEX include semaphores, monitors, message passing and file locks. Software reservation is available for both uniprocessors and multiprocessors but have different types of overheads and memory requirements.

Concurrent processes and concurrent threads often need to share data (maintained either in shared memory or files) and resources. When there is not controlled access to shared data, some processes/threads will obtain an inconsistent view of this data. The action performed by concurrent processes/threads will then depend on the order in which their execution is interleaved.

When a process/thread executes code that manipulates shared data (or resource), it is said that the process/thread is in its critical section (for that shared data/resource). Execution of critical sections must be mutually exclusive—at any time only one process/thread is allowed to execute in its critical section (including with multiple CPUs). Each process/thread must therefore be controlled when entering its critical section. The well-known critical section problem is to design a protocol/mechanism that processes/threads use so that their action will not depend on the order in which their execution is interleaved (including the case for multiple processors).

Requirements for valid solutions to the critical section problem include (1) mutual exclusion, (2) progress, and (3) bounded waiting. Progress refers to limitation of which processes/threads may participate in a decision of which process/thread will next enter its critical section in a way that the selection cannot be postponed indefinitely. Bounded waiting provides for a bound on a number of times that the other processes are allowed to enter their critical section once a process has made a request to enter its critical section (otherwise the process suffers from starvation).

Drawbacks of software solutions include: (1) processes/threads that are requesting entry to their critical section are busy waiting (consuming processor time needlessly), and (2) when critical sections are long it is more efficient to block processes that are waiting. Hardware solutions include interrupt disabling and use of special machine instructions. Interrupt disabling is generally not an acceptable solution in a multiprocessor environment because mutual exclusion is not preserved. Special hardware instructions can be used to provide mutual exclusion but need to be complemented by other mechanisms to satisfy the other two requirements of the critical section problem (and avoid starvation and deadlock). Typically additional machine instructions are added that perform two actions atomically (indivisible) on the same resource (e.g., reading and writing to a memory location). Advantages of special synchronization-related machine instructions are that they are applicable to any number of processes/threads on either a single processor or multiple processors sharing memory, they are simple and easy to verify, and they can be used to support multiple critical sections. Disadvantages are that busy-waiting consumes processor time, starvation is possible when a process/thread leaves a critical section and more than one process/thread is waiting, and deadlock. Operating system solutions include use of semaphores. A semaphore can be an integer variable that is accessed during operation through atomic and mutually exclusive operations. An implementation of a semaphore can avoid busy waiting—when a process/thread has to wait, it is put into a blocked queue of processes/threads waiting for the same event.

Details regarding the MIPS processor architecture are provided in D. Sweetman, See MIPS Run, Morgan Kaufmann Publishers, Inc. (1999), which is incorporated by reference in its entirety for all purposes.

What is needed is a simple, efficient mechanism for providing a hardware solution to mutual exclusion in a multi-threaded (including multiprocessors) concurrent environment that overcomes the drawbacks of existing solutions, particularly for a processor core using a reduced instruction computer system (RISC) architecture that limits use of additional special purpose instructions for synchronization.

SUMMARY OF THE INVENTION

The present invention has been made in consideration of the above situation, and has as an object to provide a controller, system, method, computer program product, and propagated signal which efficiently performs inter-thread synchronization among a plurality of threads that may be active on one or more of: multiple processors, on a single processor but distributed among multiple thread contexts, and/or resident in memory (virtualized threads) without deadlock.

A preferred embodiment of the present invention includes a memory interface for use with a multiprocess memory system having a gating memory, the gating memory associating one or more memory access method modifiers with each of a plurality of memory locations of the memory system wherein the gating memory returns a particular one access method modifier for a particular one memory location responsive to a memory access instruction relating to the particular one memory location, the interface including: a request storage for storing a plurality of concurrent memory access instructions for one or more of the particular memory locations, each of the memory access instructions issued from an associated independent thread context; an arbiter, coupled to the request storage, for selecting a particular one of the memory access instructions to apply to the gating memory; and a controller, coupled to the request storage and to the arbiter, for: storing the plurality of memory access instructions in the request storage; initiating application of the particular one memory access instruction selected by the arbiter to the gating memory; receiving the particular one access method modifier associated with the particular one memory access method modifier from the gating memory; and controlling access of the particular one memory location responsive to said particular one access method modifier.

Another preferred embodiment of the present invention includes a memory access method. The method includes storing a plurality of concurrent memory access instructions for one or more particular memory locations, each of the memory access instructions issued from an associated independent thread context and each of the particular memory locations part of a multiprocess memory system including a gating memory, the gating memory associating one or more memory access method modifiers with each of a plurality of memory locations of the memory system wherein the gating-memory returns one of the particular one access method modifiers for a particular one memory location responsive to a memory access instruction relating to the particular one memory location; selecting a particular one of the memory access instructions to apply to the gating memory; initiating application of the particular one memory access instruction selected by the arbiter to the gating memory; receiving the particular one access method modifier associated with the particular one memory access method modifier from the gating memory; and controlling access of the particular one memory location responsive to the particular one access method modifier.

Preferred embodiments of the present invention also include both a computer program product comprising a computer readable medium carrying program instructions for accessing a memory when executed using a computing system, the executed program instructions executing a method, as well as a propagated signal on which is carried computer-executable instructions which when executed by a computing system performs a method. This method including storing a plurality of concurrent memory access instructions for one or more particular memory locations, each of the memory access instructions issued from an associated independent thread context and each of the particular memory locations part of a multiprocess memory system including a gating memory, the gating memory associating one or more memory access method modifiers with each of a plurality of memory locations of the memory system wherein the gating memory returns one of the particular one access method modifiers for a particular one memory location responsive to a memory access instruction relating to the particular one memory location; selecting a particular one of the memory access instructions to apply to the gating memory; initiating application of the particular one memory access instruction selected by the arbiter to the gating memory; receiving the particular one access method modifier associated with the particular one memory access method modifier from the gating memory; and controlling access of the particular one memory location responsive to the particular one access method modifier.

BRIEF DESCRIPTION OF THE DRAWINGS

FIG. 1 is a schematic block diagram showing a preferred embodiment of a system employing the present invention; and FIG. 2 is a schematic block diagram illustrating a preferred embodiment of an ITU coupled to a gating storage as shown in FIG. 1.

DESCRIPTION OF THE PREFERRED EMBODIMENT

The present invention relates to multiple thread synchronization activities on one or more processing elements. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In the context of the present invention, the following terms have their meaning as understood to a person of ordinary skill in the art while including the specific definition set forth below.

Multithreading refers to the concurrent presence of multiple active threads or contexts of execution on the same computing system that includes one or more central processing units (CPUs), real, virtualized, or other. Multithreading is an increasingly widely-used technique for tolerating memory and execution latency and obtaining higher utilization out of processor functional units. Multithreading may be instantiated in processors spanning an order of magnitude in processor die area and performance, and therefore it is preferably scalable in implementation and manageable in its frequency effects. Implementations should anticipate and facilitate multithreaded program and execution models common to multithreaded CPUs and multiprocessor configurations of either single-threaded or multithreaded CPUs. There is an overhead of creating, synchronizing, and destroying threads that establishes a practical limit to a granularity at which multithreading is usefully applied, therefore solutions are preferably engineered to help minimize these overheads, particularly for high-probability cases.

A thread is a sequential instruction stream. Many conventional processors run a single thread at a time.

A task is a collection of processor state necessary to describe the state of execution of an operating system, containing one or more threads, but also including translation look-aside buffer (TLB) mappings, exception vector bindings, software-managed system resources, and the like.

"Processor Context" is sometimes used interchangeably with "Thread Context" in single-threaded CPUs. As used herein, processor context is a collection of software-visible/software-modifiable state that describes where a processor is in the course of the execution of a program. The scope of a "processor context", this can go beyond the "program context" that is visible to a user program, as it may include privileged resource state invisible to an application, such as MMU settings, interrupt controller configuration, timers, etc.

A hardware thread, or thread context, is the processor hardware state necessary to instantiate a thread of execution of an application instruction stream, including general purpose registers (GPRs), multiplier hi/lo, and, in some cases, some associated privileged CP0 state such as an exception program counter (EPC), BadV Addr, Cause, and the like.

A virtual processing element (VPE) is the processor state and logic necessary to instantiate a task. It is an instantiation of a full architecture and elements, including privileged resources, sufficient to run a per-processor operating system image.

A virtual multiprocessor (VMP) is a collection of interconnected VPEs. A VMP may be a single multithreaded processor core that implements multiple VPEs, and allows them to run concurrently. A VMP may also be composed of multiple RISC cores, each of which may (or may not) be multithreaded.

A multithreaded processor is a processor that is able to have more than one thread active at a time. That is, it may have more than one valid program counter and more than one set of general purpose registers.

The preferred embodiment of the present invention allows two distinct, but not mutually-exclusive, multithreading capabilities. A first capability is that a single MIPS processor or core may contain some number of VPEs, each of which supports a processor context. Thus, a processor having a multiplicity of VPEs may look like a multi-way symmetric multiprocessor. A second capability is that there is support for 'fine grained,' lightweight threads which do not contain an entire state (hence the term lightweight) which an equivalent single threaded processor would. The VPEs on the other hand contain the 'entire state' which an equivalent single threaded processor would. Hence they are a bit heavier.

Many conventional uniprocessors, using the above definitions, had a single thread and a single VPE. A processor supporting N number of VPEs is isomorphic to an N-processor multiprocessor (i.e., symmetric multiprocessor (SMP)-capable operating systems may manage the set of VPEs that transparently share the processor's execution units). A processor with a single thread and multiple VPEs is generally perceived as a less logical combination but could, theoretically, save some context switch overhead in a multiprogramming system. A processor with multiple VPEs and multiple threads is configurable to emulate a multiprocessor, to act as a single multithreaded processor, or some combination of the two.

One goal of the present invention is to provide a model wherein a multithreaded program will have the same semantics on a multiprocessor as on a multithreaded processor. In such a model, threads communicate with one another through mapping inter-thread communication (ITC) to a system-wide resource, such as for example a global shared memory. Communicating via memory, in general, tends to create a relatively coarse limit on the level of concurrency that may be exploited, because general memory cannot impose ordering semantics on accesses. The present invention uses a system-wide resource "memory space" that is a subset of general system memory that is adapted to scalable implementation on a single chip.

In some implementations, a load-locked/store-conditional (LL/SC) model is not optimal for a fine-grained synchronization in a multithreaded processor. For purposes of the present application, the LL/SC model refers to a synchronization protocol that is an alternative to atomic test-and-set sequence that is part of many traditional instruction sets. The LL/SC instructions provide a test-and-set sequence that operates without any guarantee of atomicity but that succeeds (and provides information about the success) only when it turned out to be atomic. Such conventional implementations having a single LL flipflop per processor may not be well-behaved in situations where multiple threads are concurrently attempting to acquire semaphores used in inter-thread communication. This is because many conventional implementations of LL clear the LL flipflop on context switches and on shared memory writes. This expedient may make it impossible to guarantee forward progress in a fine-grain multithreaded processor. One extrapolated solution arising from these conventional systems suggests replicating the LL flipflop as well as a locked address latch per-thread. However, every store of every thread of every VPE of every processor would likely have to be compared against all locked addresses to permit clearing only the LL flipflops associated with matching addresses. It is anticipated that such a solution would be expensive in terms of data paths and/or store bandwidth.

The LL/SC model described above requires a conditional branch and retry on a SC failure. In a single-threaded environment, where computation cannot otherwise advance, this branch and retry solution is sometimes an acceptable use of instruction and issue bandwidth. In a fine-grained multithreaded execution environment, this polling mechanism of waiting during synchronization consumes precious instruction bandwidth. The present invention uses a non-polling mechanism as an alternative to the polling mechanism used by LL/SC.

The present invention uses an alternative to LL/SC that includes a special memory access protocol in which a thread accesses this special memory using a direct physical memory decode. However, in other implementations it is possible for a thread to access locations of this special memory by virtue of a special memory attribute (e.g., the thread may use the TLB) as a form of "cache" attribute. For example, MIPS U.S. Pat. No. 6,643,759 entitled "Mechanism to Extend Computer Memory Protection Schemes" provides one mechanism that may be adapted for such use, this patent expressly incorporated by reference in its entirety for all purposes. This LL/SC alternative has a property of being an independent, inter-thread communication (ITC) address space that is potentially visible to all hardware threads in a system. Further details of the structure and operation of a preferred form of a suitable memory space for an ITC memory space is included and described in the related and incorporated patent applications identified above. This memory space includes non-memory-like properties, such as empty/full bits for implicit synchronization. Each entry in this special memory space has one or more sets of one or more bits of state attached to each element (e.g., word) such that if it is "empty" a load to it will stall until a store from another thread produces the data and sets the location to "non-empty." Similarly, if it is "full" a store to it will stall until a load from another thread consumes the previous value and sets the location "non-full."

This empty/full signaling is but one example of well-known synchronization processes. Another well-known synchronization process includes use of a P/V semaphore. The P/V semaphore is a synchronization protocol using a variable that is operated on by two atomic operations: P(semaphore) waits for the variable to become positive, then decrements it by one; and the V(semaphore) increments the variable by 1. For purposes of the present invention, these synchronization processes are referred to herein as "access methods" for a storage location. The referenced patent application relating to the structure and operation of the preferred special ITC address space teaches that this special memory space may include a plurality of access method modifiers (also referred to therein as functions or views) for each storage location, some of which are implementations of well-known synchronization constructs and others may be one or more custom synchronization construct(s) applicable to the storage locations. In general, an access method modifier includes state bits and/or control flags used in implementing a particular access method. The preferred embodiment of the present invention identifies a particular access method to be used in accessing a particular memory location in the special ITC address space by examining the operand for the memory access instruction. This access method is implemented by using the access method modifier stored in a data structure associated with the memory location identified by the operand.

For purposes of the present invention, this special ITC address space is referred to herein as a gating storage. As used herein, the term "gating storage" includes memory systems that include a fundamental property wherein that the memory system's availability controls ("gates") an execution of an associated instruction stream. For example, in order for precise context switches to be possible (among other things), it must be possible to interrupt and restart an operation, which requires a precise exception, long after any TLB checks would have been performed. While the present invention preferably uses a structure and operation of the gating storage as described in the incorporated patent application, as well as more generally described herein, other implementations of a gating storage that associate one or more access method modifiers to each of one or more storage locations in globally accessible special storage may be used in specific implementations and embodiments of the present invention. However, ITC as used herein need not be limited to implementations using gating storage and other structures and methods of the present invention may use non-gating storage.

This gating storage, being referenced by loads and stores, does not require single-cycle latency to avoid stalling any pipelines. This is because it uses the fast thread context switch provided in multithreaded processors to hide latency to accessing the ITC. It is appreciated that some uses of low-level blocking synchronization techniques such as empty/full storage often impose constraints on implementation and microarchitecture. For example, a load or a store blocked on a location that is respectively empty or full must not lock up any resources (e.g., internal buses) that may be required for the unblocking store or load. However, multithreaded. processors provide support for addressing these constraints; the present invention leverages this support to switch threads on and off.

FIG. 1 is a schematic block diagram showing a preferred embodiment of a system 100 employing the present invention. System 100 includes a plurality (N) of multithreaded processors $105_i$ each coupled to a gating storage 110. Each processor $105_i$ is capable of concurrent support of a plurality of thread contexts 115 that each issue instructions, some of which are access instructions into gating storage 110. An inter-thread communications unit (ITU) 120 manages these access instructions by storing access instructions in a-request storage 125 (a buffer/memory inside ITU 120) and communicates with the thread contexts (and other processor resources) using one or more first-in first-out (FIFO) registers $130_x$.

Processor $105_i$ includes a load/store FIFO (FIFO $130_{L/S}$) for transmitting information to ITU 120 and a data FIFO (FIFO$_{DATA}$) for receiving information from ITU 120. ITU 120 communicates with various resources of its processor $105_i$ through FIFOs $130_x$, such as for example with an arithmetic logic unit. (ALU), a load/store unit (LSU) and task scheduling unit (TSU) when communicating with various thread contexts 115. Further structure and a more detailed description of the operation of ITU 120 are provided below in the discussion of FIG. 2. The main responsibility of the TSU is to switch threads. While the following description makes use of these LSU/ALU/TSU functional blocks, these blocks and the interdependence of these blocks are but one example of an implementation of a processor 105. In a broad sense, gating storage 110 is a memory, and ITU 120 is a controller for this memory and the manner by which a memory controller communicates to its memory and to a processor may be implemented in many different ways.

Gating storage 110, in a generic implementation, may include one or both of two special memory locations: an inter-thread communications (ITC) storage memory 150 and a FIFO gating storage 155. Memory 150 includes a memory structure that stores data and associates one or more (preferably two or more) memory access method modifiers for each data location. Memory 150 accesses, responsive to access instructions from ITU 120, a particular data location using a selected one of the associated access method modifiers for that particular data location. Specifics of the operation of memory 150 are set forth in the incorporated related application filed on even date herewith.

FIFO gating storage 155 allows threads in a-multithreaded processor to synchronize with external events. The data of storage memory 150 enables thread-to-thread communication and the data of FIFO gating storage 155 enables thread-to-external event communication. FIFO gating storage 155 includes FIFOs 160 for communications in these data driven synchronization activities.

ITU 120 of each processor $105_i$ is coupled to gating storage 110 (to memory 150 and to FIFO gating storage 155) as well as to each other ITU 120 of other processors $105_k$ of system 100 for bidirectional communication. Other resources of system 100, such as the main memory/cache memories and other functional/logic units are not expressly shown in FIG. 1 to simplify the diagram and description of the present invention but are implicitly present as well-understood in the art.

FIG. 2 is a schematic block diagram illustrating a preferred embodiment of ITU 120 coupled to gating storage 110 as shown in FIG. 1. ITU 120 includes request storage 125 and a controller 200 coupled to both request storage 125 and to an arbiter 205. A multiplexer 210, coupled to an output of request storage 125, selects a particular entry in request storage 125 responsive to a selection signal from arbiter 205. ITU 120 receives and transmits data to thread contexts 115 shown in FIG. 1 using a plurality of data channels 215, including a status channel $215_{STATUS}$ and a LSU data channel $215_{LSU}$.through a processor interface 220. The data channels $215_x$ use one or more FIFOs $130_x$ shown in FIG. 1. ITU 120 has a command/response protocol over interface 220 with respect to the LSU and a status/kill protocol over interface 220 to processor $105_i$.

Additionally, ITU 120 communicates with gating storage 110 and with other devices (including other ITUs 120) using an external interface 225. Controller 200 manages internal interfaces to thread contexts 115 using processor interface 220 (through the LSU/status channels for example) and to external (external to each processor $105_i$) interfaces (such as gating storage 110 and other ITUs 120 of other processors $105_j$).

ITU 120 implements a capability called fine grained synchronization using gating storage 110. A memory management unit (MMU) of a processor $105_i$ (e.g., one or more TLB entries in an alternate preferred embodiment instead of the direct mapping of the preferred embodiment) maps a virtual memory page to gating storage 110. Each processor $105_i$ provides an ability to add a flexible/extendable ITC storage through marking TLB entries as belonging to main memory or gating storage 110 using direct memory address decoding or the extended attribute flags as discussed above. In processors $105_i$, gating storage 110 is non-cached, though some implementations may cache the contents.

Each ITU 120 is a separate functional block from the LSU of each processor 105. This allows system 100 to extend the LSUs cleanly. An advantage of the preferred embodiment in providing gating storage 110 external to each processor $105_i$ is that system 100, instantiating one or more processors $105_j$, is able to map gating storage 110 to:

Single processor gating storage 110 for synchronizing thread contexts within processor $105_i$ I/O devices (FIFOs etc.) for data driven synchronization Multiple processors 105i in a multiprocessor configuration for synchronizing thread contexts across processors The design and operation of ITU 120 assumes that gating storage 110 may change state asynchronously and therefore support for that is provided at external interface 225, for example through an external interface pin referred to below as "its_ext_event." This support in the preferred embodiment is that the ITU 120 monitors this signal for a pulse—when a pulse is detected it cycles through the accesses that are waiting in the shelf. By using this event-driven protocol it avoids constant polling and consuming unnecessary power. Whenever an access is made by a processor, it is responsible for strobing this interface element on the rest of the ITUs 120. This causes all ITUs 120 to cycle through the accesses of their request storage to provide multiprocessor support into the single gating storage. In the description of the construction and operation of ITU 120, some representative signals that may be used in implementing certain of the described features are set forth as an aid for understanding with the understanding that other implementations may use different signals or enabling methodologies. These representative signals described herein are additionally described in Table III, below.

ITU 120 accepts loads/stores (LDs/STs), after any required translation, from an LSU. The LSU detects whether any particular load or store is happening to an ITC page (these pages exist in gating storage 110) based on a decode in the physical memory space. These LD/ST "requests" are included within the scope of the term "memory access instruction" as used herein. Controller 200 causes ITU 120 to store each memory access instruction in request storage 125. Request storage 125 of the preferred embodiment has $N_{TC}$ number of entries, where $N_{TC}$ is the number of hardware threads supported by the associated processor 105. This number of entries allows ITU 120 to keep "active" one gating storage 110 access from each thread context 115.

As soon as an ITC request (memory access instruction) from a particular thread context $115_P$ is detected in a memory access stage of a particular processor $105_P$, a pipeline scheduler of processor $105_P$ nulls all outstanding instructions and stops issuance from thread context $115_P$ (for example, a suitable signal from the memory access stage is sent locally between the LSU and the TSU of processor $105_P$) and a program counter (PC) of this LD/ST memory access instruction is captured in a request to ITU 120. For example, the LSU requests the TSU of processor $105_P$ to stop issuing from thread context $115_P$ before knowing when a particular ITC request is successful, to avoid timing issues from arising.

Controller 200 continues to add memory access instructions to request storage 125 as they are received, and continues to apply these memory access instructions to gating storage 110. At some point, depending on the occupancy of request storage 125 (RS), there may be multiple unsuccessful accesses and/or multiple untried memory access instructions in request storage 125. At this point, memory access instructions in request shelf 125 are arbitrated and sent out periodically to external interface 225 (described in more detail below). Arbitration is accomplished by controller 200 applying an arbitration policy to arbiter 205 which selects a particular one memory access instruction from request shelf 125 using multiplexer 210.

In the case of a 'success' (i.e., the memory access instruction is executed using the applicable memory access method modifier extracted from gating storage 110 that was related to the memory storage location referenced by the memory access instruction) ITU 120 sends back a response to processor $105_P$ over processor interface 220. Data and acknowledge are both sent back for a load type operation while an acknowledge is sent for a store type operation. In the preferred embodiment, an acknowledge is sent to processor $105_P$ (e.g., the LSU sends acknowledgement to the TSU) also, which moves that thread context $115_P$ state from blocked to runnable. The memory access instruction to ITU 120 completes and is de-allocated from request storage 125.

In the case of a 'fail' (i.e., the memory access instruction is unable to be executed using the applicable memory access method modifier extracted from gating storage 110 that was related to the memory storage location referenced by the memory access instruction) ITC 120 performs any necessary housekeeping on management tag data associated with the stored memory access instruction. Please note that in the present invention, "tag" has a meaning that is not limited to modern terminology relating to a cache or cache operation since it includes an index generated from a target address and extra state bits as described herein. Whenever a new access is made to ITU 120, or an external event occurs on external ITU interface 220, ITU 120 retries all the outstanding requests in request storage 125, for example using a FCFS (First Come First Serve) arbitration policy. This preferred policy ensures fairness and is extendable in a multiprocessor situation.

On an exception being taken on a particular thread context $115_P$ or when thread context $115_P$ becomes Halted, processor $105_P$ signals an abort for the outstanding ITC access of thread context $115_P$. This abort signal causes ITU 120 to resolve a race condition (the "race" between aborting that operation or completing the operation which could have occurred in the few cycles it takes to cancel an operation) and accordingly to cancel or to complete the blocked memory access instruction operation and return a response to interface 220 (e.g., using IT_resp[2:0]). Processor 105 using interface 220 (e.g., using the IT_Cmd bus) requests a kill by signaling to ITU 120 (e.g., by asserting the kill signal on IT_Cmd along with the thread context ID (e.g., IT_cmd_tcid[PTC-1:0])). Processor 105 maintains the abort command asserted until it samples the kill response. Possible values for the response signal are set forth in Table III.

In the preferred embodiment, ITU 120 responds to the abort with a three bit response, signaling abort or completion. The response triggers the LSU, which accordingly de-allocates the corresponding load miss-queue entry. This causes the instruction fetch unit (IFU) to update the EPC of the halting thread context $115_P$ accordingly. In other words, when the abort is successful, the PC of the memory access instruction is used; but when the operation completes then the PC of the next instruction (in program order) is used to update the EPC of thread context $115_P$.

For loads, ITU 120 returns a response and the LSU restarts thread context $115_P$ corresponding to the thread context ID on the response interface. For stores, ITU 120 returns an acknowledgement and, similar to the load, the LSU restarts the thread context.

As discussed above, ITU 120 accepts multiple memory access instructions and keeps them pending. To be exact, ITU 120 maintains one memory access instruction outstanding per thread context 115. The format of an entry of request storage 125 is shown in Table I. The number of entries is configurable, and in the preferred embodiment, is equal to the number of hardware thread contexts ($N_{TC}$). As shown, associated with each entry is an optional counter $N_{TRY}$ that is used to monitor a number of times that any particular entry in request storage 125 has been applied to gating storage 110. In the preferred embodiment, $N_{TRY}$ is initialized at zero and incremented each time it is applied to gating storage 110. After a "fail" in which the memory access instruction is unable to be completed, $N_{TRY}$ is incremented and compared against a threshold value. When $N_{TRY}$ exceeds this threshold, ITU 120 aborts the associated memory access instruction and notifies its associated processor 105 that an exception has occurred. This counter thus permits a two-phase operation for ITU 120: phase one "spins" for a preset but limited term, and then phase two prevents endless spinning by excepting the memory access instruction and permitting processor 105 to handle the situation appropriately. This two-phase synchronization policy allows for high performance synchronization by preventing endless or long-term spinning (phase I type operation). In the preferred embodiment, the threshold is set to permit five applications of a memory access instruction before issuing the exception. Some implementations of ITU 120 may not include the $N_{TRY}$ counter, or set the threshold (e.g., to zero) so ITU 120 does not ever enter into a phase I operation mode. As noted above, the $N_{TRY}$ counter is optional as some implementations may prefer to omit phase I operation and immediately issue an exception upon a 'failed' memory access instruction in all instances. In other implementations, phase II operation may be omitted permitting an instruction to spin until the memory access is allowed.

TABLE I

Request Storage Entry Format

| Field | Description |
|---|---|
| PC[31:0] | The PC of the memory access instruction |
| TYPE[2:0] | LDC, LW, LH, LB, SDC, SW, SH, SB |
| ADDR[31:3] | Address of the memory access instruction |
| TC_ID[2:0] | ID of the thread context issuing the memory access instruction |
| SDATA[63:0] | 64 bit store data |
| P | Pending bit. Used to kill/abort the transaction cleanly |
| V | Valid bit. This entry is occupied |
| $N_{TRY}$ | 12 bit counter value |

In the preferred embodiment, the $N_{TRY}$ counter value and/or the threshold (and in some cases other parameters and operational characteristics of ITU 120) are modifiable so that different memory access instructions will be in the different phases and/or handled differently. Some modifications may include skipping phase I for some memory access instructions, or spinning longer in phase I for other memory access instructions. Request storage 125 or gating storage 110, as appropriate, may include extra flag bits or data control flags to provide individualized overlays on top of the data in ITU 120 and gating storage 110 that modify operation of ITU 120. Table II below includes examples of some implementations of these flags. In some cases, the arbitration policy may be modified to change an order in which memory access instructions are applied to gating storage 110.

ITU 120 accepts memory access instructions from thread context $115_P$ using interface 220 (e.g., on an ITU_Cmd bus) after the memory access instructions are translated and deemed to be for gating storage 110. The decode is done in the LSU for speed. The TSU stops issuing from thread context $115_P$ (because the LSU signaled the TSU) when it decoded the memory access instruction in the memory access stage. The response for a load memory access instruction comes back through interface 220 (for example on an IT_resp_ld-data[31:0] bus) along with a strobe (e.g. IT_resp[2:0]) to the LSU. The LSU of the preferred embodiment handles alignment and any endianess swap of the data.

Controller 200 controls a gating storage 110 store port of processor 105. This store port allows for a multi-ported gating storage 110. In the following example implementation, processor 105 is an instantiation of a MIPS RISC microprocessor core. A description of the actions taken for some various types of LD/ST memory access instructions supported by ITU 120 is given next.

Controller 200 includes a finite state machine (FSM) for controlling the external interface 225 that is non-pipelined (though an alternate implementation could feature a pipelined memory interface). The FSM is able to issue three commands: read-lock, read, and write. As long as request storage 125 has valid entries and an external to ITU 120 event has occurred, the FSM (with the help of arbiter 205) selects a stored memory access instruction and then issues it to external interface 225. As discussed above, the specific memory access instruction selected is chosen in FCFS order. When the command is accepted, the FSM waits for a valid response on external interface (e.g., (ITU_Cmd_Resp[1:0]!=0x0)). External interface 225 is able to hold/suspend any particular operation by not giving it a valid response. External interface 225 continues asserting its command phase signals until it receives the valid response indication. This handshaking allows for a simple, non-pipelined multi master external interface 225 shared among two or more ITU 120s. A read-lock transaction causes a lock signal to be asserted on external interface 225, which keeps external agents from accessing gating storage 110, until unlocked.

In order to support an atomic update of gating storage 110, external interface 225 uses a signal: itu_cmd_lock. The itu_cmd_lock signal is set when a read-lock command is sent to external interface 225. The lock is de-asserted for at least one cycle before a new access from request storage 125 is serviced. This gives an external agent (e.g., another ITU 120) an opportunity to intervene and not starve. When the external agent wants to keep accessing gating storage 110, then this agent avoids giving a response to ITU 120 until it has finished its gating storage 110 access.

In order to cause ITU 120 to retry, this external agent asserts an its_ext_event signal during any cycle. This signal (i.e. the its_ext_event) forces ITU 120 to retry all the outstanding requests in request storage 125 once in a FCFS order. This event based retry (as opposed to continuous retry) also helps reduce power.

As indicated above, the preferred embodiment of the present invention uses gating storage 110 to associate two or more access method modifiers with each gating storage memory location. The preferred embodiment of the present provides that a gating storage location may be accessed in various ways, each of the ways termed a "view." Each view provides, in the preferred embodiment, a different access method modifier to apply to a memory access instruction operating on a storage location in gating storage 110. These views/access method modifiers include Empty/Full primitive and P/V semaphore synchronization paradigms. The following discussion describes application of these paradigms to memory access load/store (LD/ST) operations using ITU 120. Some, all, or none of the data in the access method modifier data structure are accessed by any particular view.

In an Empty/Full view targeting storage memory 150, a load causes an issuing thread to block when the cell is empty, and returns a load value when the cell is not empty and sets the Empty state. Stores block when the cell is Full and when not Full, accepts a store value and sets the full state. For an Empty/Full LD memory access operation, the FSM of external interface 225 takes an EF-LD memory access instruction from request shelf 125 and issues it as a read-lock operation to external interface 225. Controller 200 concurrently marks that EF-LD memory access instruction as pending (P) in request storage 125. Gating storage 110 returns data as well as an EF state. When the E state bit is read as 0x1 then the operation blocks and so request storage 125 is updated accordingly and the lock is reset (Pending bit is reset, $N_{TRY}$ is incremented). As mentioned above, one purpose of the lock signal at external interface 225 is to allow multiple masters on external interface 225. (Since the operations on gating store 110 are two part operations, all external masters need to be locked in order to support an atomic update of gating storage 110). When the E bit was read as 0x0 then the load value is sent back to processor 105$i$ along with a valid response, write operation is done with the E bit set to 0x1, and controller 200 de-allocates the associated entry in request storage 125. The lock is de-asserted when the completes.

For an Empty/Full ST memory access instruction, the FSM of external interface 225 takes an EF-ST memory access instruction from request storage 125 and issues it as a read-lock operation to external interface 225 as described above, concurrently marking the memory access instruction in request storage 125 as pending (P). When in the response, the F state bit is 0x1 then the operation is blocked, request storage 125 is updated as in the EF-LD case, and the lock is reset. When the F bit is 0x0 a write operation is first sent to gating storage 110, with the F bit set to 0x1 and with the proper bits inserted into the store data bus. Then, when the operation completes, controller 200 de-allocates the entry in request storage 125 and de-asserts the external interface lock. When a trap (T) bit is set, all EF view accesses, whether a success or a failure, cause a gated exception trap.

In an EF Try View targeting storage memory 150, the ITC location is similar in nature to the previous EF Synchronized view in most respects other than the waiting policy on an access failure. This view is used in the preferred embodiment when the issuing thread may potentially find something else to do and does not wish to be blocked when the access fails. A LD with this view will return a value of zero when the cell is Empty, regardless of actual data contained. Otherwise the LD behaves as in the EF Synchronized case. Normal stores to full locations through the EF Try view fail silently to update the contents of the cell, rather than block the thread. SC (Store Conditional) instructions referencing the EF Try view will indicate success or failure based on whether the ITC store succeeds or fails. When the T bit is set, then all EF Try view accesses, whether a success or a failure, cause a gated exception trap.

In the PV view, the Empty and Full bits are not modified, both of which are assumed to be cleared as part of a cell initialization routine. Loads with this view return the current cell data value when the value is non-zero, and cause an atomic post-decrement of the value. When the cell value is zero, loads block until the cell takes a non-zero value. Normal stores cause an atomic increment of the cell value, up to a maximum of 0xffff at which point the value saturates. LW checks 32$b$, LH checks 16$b$ and LB checks 8$b$ for 0x0. A read-lock operation is used as in the EF views to do the increment/decrement atomically. The operation of SC using this view is undefined. When the T bit is set, all PV Synchronized view accesses, whether a success or a failure, cause a gated exception trap.

In an PV Try View, the ITC performance is similar in nature to the previous PV Synchronized view in most respects other than the waiting policy on an access failure. This view is used in the preferred embodiment when the issuing thread may potentially find something else to do and does not wish to be blocked when the access fails. A LD with this view returns a value of zero even when the cell contains a data value of 0x0. Otherwise the LD behaves as in the PV Synchronized case. Normal stores using this view cause a saturating atomic increment of the cell value (saturating to 0xffff), as described for the PV Synchronized view, and cannot fail. The operation of SC using this view is undefined. When the T bit is set, then all PV Try view accesses, whether a success or a failure, cause a gated exception trap.

In the Bypass view targeting storage memory 150, a load or a store will not cause the issuing thread to block and will not affect the Empty or Full state. Bypass-LD memory access instructions never block and they do the read operation only to external interface 225 (no lock). Bypass-ST memory access instructions also never block and do a write operation only to external interface 225.

In the Maintenance view targeting storage memory 150, state information in gating storage 110 is manipulated. Maintenance-LD memory access instructions never block and they do the read operation only to the external interface (no lock). The returned value is the state value read from gating storage 110. Maintenance-ST memory access instructions also never block and do a write operation only to the external interface (no lock). The corresponding byte enables (itu_state_be) are set so that only the state bits of the selected gating storage 110 location get written.

On a read/read-lock access, gating storage 110 may return an exception on external interface 225 (e.g., on a set of ITU_Cmd_Resp[1:0] pins (values of either 0x2 or 0x3)). The exception code 0x2 denotes a bus error, while the code 0x3 allows for thread contexts 115 that are blocked long term to unload their hardware contexts. This may be done by setting the T bit in gating storage 110, which when sampled as 0x1 (externally) using a gating storage view (e.g., the EF view or the PV view), delivers an exception to processor 105 through ITU_Cmd_Resp[1:0]1. External interface 225 is also able to issue a bus error.

The present invention contemplates many different types of gating storage 110 configurations and implementations. Gating storage 110 of the preferred embodiment includes a set of tagging data (seven bits) in a particular format to provide flexibility. Table II ITC Tag Format describes this set of tagging data. Gating storage 110 allows for a user selectable number of 32$b$ entries (1, 2, 4, 8, and 16). Gating storage 110 contains a store of user selectable size. Both a tag portion and a data portion of the preferred embodiment of gating storage 110 for system 100 are implemented with flipflops due to the small size of the store (Max Data size: 64 bytes, corresponding to the sixteen entry case). The data interface is thirty-two bits.

TABLE II

ITC TAG FORMAT

| Field | ITC Store Tag Description |
|---|---|
| RFIFO[6] | RW, Reset FIFO Bit. Processor 105 resets the FIFO by writing to this bit. |

TABLE II-continued

ITC TAG FORMAT

| Field | ITC Store Tag Description |
|---|---|
| FIFO[5] | RO, If this bit is read as 1, then this location maps a FIFO. i.e. More than 1 memory location is behind this cell. Both loads and stores can possibly be done to this location. |
| T[4] | RW, Trap Bit. This bit when read as 0x1, causes the processor to take a thread exception on PV or EF accesses. |
| SB[3] | RW, Store Blocked indication. A value of 1 indicates that a load has blocked on this location. |
| LB[2] | RW, Load Blocked indication. A value of 1 indicates that a store has blocked on this location. |
| F[1] | $RW_1$, Full Bit. This bit indicated that the location is 'Full'. |
| E[0] | $RW_2$, Empty Bit. This bit indicates that the location is 'Empty'. |

Gating storage 110 allows for efficient synchronization between concurrent threads. A couple of common synchronization constructs are mutexes and semaphores. Shown below are some code snippets that may be used to lock/unlock a mutex, when implemented in gating storage 110. This example follows the POSIX thread standard's API requirements and uses the memory location to store the state of the mutex (as opposed to using the F/E bits to store the state of the mutex). Note that the E/F bits are used to gain exclusive access to the memory location, while the value in the cell location is used to signify locked (0x0) or not-locked (Not 0x0).

```
__mutex_lock: // Assume mutex_init initializes a0 to Full with a value
!=0x0.
lw a0, ITC_Offset(a0) // This line needed for POSIX oddity.
// Blocks if E is set; If E bit is not-set then it sets E bit.
lw v0, EF_Sync_Cell_View(a0)
__mutex_trylock: // If this fails, return FAIL.
lw a0, ITC_Offset(a0) // This line needed for POSIX oddity.
// Blocks if E is set; If E bit is not-set then it sets E bit.
lw v0, EF_Try_Cell_View(a0)
__mutex_unlock:
lw a0, ITC_Offset(a0) // This line needed for POSIX oddity.
// Doesn't block. If F bit is 0x0 then sets F bit, otherwise fails
silently
sw a0, EF_Try_Cell_View(a0)
```

Another example below shows a blocking semaphore implementation using gating storage memory 110. A semaphore historically allows two operations called P (wait for event) and V (signal an event). One implementation of these two operations is shown below. In this implementation, the semaphore blocks before the decrement during the P operation. The EF bits do not play a role in these primitives.

```
__sema_P: // Assume sema_init initializes a0 to Full.
// If location is 0x0 then it blocks, otherwise returns value and
// post-decrements the value in that cell.
lw v0, PV_Sync_Cell_View(a0)
__sema_V:
// If location is 0xffff, then no effect,, otherwise increments the value
// increments the value in that cell.
sw v0, PV_Sync_Cell_View(a0)
```

Table III below presents a detailed list of major signals between the units of system 100 and ITU 120. All signals leaving ITU 120 are registered. The structure of system 100 permits ITU 120 to be extended or replaced, so interface 220 is streamlined into two sub-groups ((a) Command/Response and (b) Status). Generally speaking, the Command/Response sub-interface mainly interfaces to the LSU on processor 105 while the Status sub-interface mainly interfaces to the ALU on processor 105 in this embodiment. External interface 225 follows a command/response protocol as well. A correspondence of signals to an applicable phase is noted in the naming convention of various signals

TABLE III

ITU Detailed Interface

| Signal Name | Description | I/O |
|---|---|---|
| | External Interface (Cmd/Response) | |
| IT_cmd[2:0] | Fully decoded command from processor 105:<br>0x0 - No operation<br>0x1 - Rd<br>0x2 - Wr<br>0x4 - Kill the outstanding operation in the ITC corresponding to the TC ID on IT_cmd_tcid[N-1:0] | I |
| IT_cmd_pa[12:2] | PA of request | I |
| IT_cmd_be[3:0] | Byte enables | I |
| IT_cmd_tcid[3:0] | Thread Context ID of the current command | I |
| IT_cmd_wdata[31:0] | Write Data | I |
| IT_resp[2:0] | Response to processor 105:<br>0x0 - No value<br>0x1 - Response successfully completed (for LD/ST completion)<br>0x2 - Completed with Bus Error<br>0x3 - Completed with Scheduler Exception Error<br>0x4 - Killed (Restart PC is in the processor<br>0x5-0x7 - Reserved | O |
| IT_resp_lddata[31:0] | Load data to LSU. | O |
| IT_resp_tcid[3:0] | Thread Context ID of the response | O |
| IT_blk_grain[3:0] | Indicates the block grain | I |
| IT_num_entries[3:0] | Indicates the number of ITC entries | I |
| | External Interface (Status/Kill) | |
| IT_status_busy | For WAIT instruction | O |
| | ITU Store Interface | |
| itu_ext_cmd[2:0] | ITU Command valid and type of command:<br>0x0 - No operation<br>0x1 - RD<br>0x2 - WR<br>0x3 - Reserved | O |
| its_ext_cmdresp[1:0] | ITC Store replies with the response to the command on ITU_Cmd.<br>0x0 - Wait, No response<br>0x1 - Valid response<br>0x2 - Access Error<br>0x3 - ThrowSchedulerTrap | I |
| Itu_ext_cmd_addr[12:2] | Physical Index of the ITC Store.<br>8 KB in processor 105 | O |
| itu_ext_cmd_lock | When accepted, then Lock is in effect until the next Cmd phase when Lock is de-asserted. | O |
| Itu_ext_cmd_data[31:0] | Write Data. The byte enables are on itu_ext_cmd_be | O |

TABLE III-continued

ITU Detailed Interface

| Signal Name | Description | I/O |
|---|---|---|
| itu_ext_cmd_state_data[7:0] | State Write Data. The byte enables are on itu_ext_cmd_state_be | O |
| itu_ext_cmd_be[7:0] | Write Byte Enables | O |
| itu_ext_cmd_state_be[7:0] | State Write Byte Enables | O |
| its_ext_event | An event external to the processor 105 core happened. Forces the ITU to retry all its outstanding operations once (e.g., in a FIFO/FCFS manner). | I |
| its_ext_rdata[31:0] | Read Data | I |
| Its_ext_state_rdata[7:0] | State Read Data | I |
| Gfclk | Free running processor clock | I |
| Gclk | Stoppable processor clock (Most logic will be on this) | I |

The preceding description is general and pertains primarily to single storage locations at each memory location in the gating storage/ITC memory (e.g., storage 150). However, m some instances (such as for FIFO memory 155) it is possible that behind each gating storage 110 location or cell there is more than one memory location. This is useful for mapping hardware FIFOs (both tail and head of the FIFO). The FIFO bit is read-only, for software to poll to determine the nature of the ITC cell. The RFIFO bit is available for resetting the FIFO to empty. The user is allowed to choose how many of the total number of ITC cells may be mapped as FIFOs. The first N cell locations (where N is determined by the user at design compile) will be mapped to FIFOs of the depth defined by the user.

The preferred embodiment of the present invention, as described above, provides that an ITC location may be accessed in various ways, each of the ways being termed a view. The implementation of a preferred set of views are described above. When the ITC location or cell is of type FIFO (determined by the tag/state bit [3]), the behavior of some of the views changes and this is noted below.

For the EF Synchronized View: When the ITC location is of type FIFO, then the ITU does not do the update of the E or F state bit when a success is detected during the first read-lock operation. The FIFO memory block is responsible for updating these bits as it knows the depth of the FIFO.

For the EF Try View: When the ITC location is of type FIFO, then the ITU does not do the update of the E or F state bit when a success is detected during the first read-lock operation. The FIFO memory block is responsible for updating these bits as it knows the depth of the FIFO.

For the PV Synchronized View: PV Synchronized view is not allowed to FIFO ITC locations of the preferred embodiment, however some implementations may implement such a view.

For the PV Try View: PV Synchronized view is not allowed to FIFO ITC locations of the preferred embodiment, however some implementations may implement such a view.

For the Bypass View: Bypass view to FIFO ITC locations will return or store to the top entry of the FIFO without affecting the state bits.

For the Maintenance View: A store using this view to a FIFO location with bit [4] (RFIFO) set causes the FIFO to reset its read and write pointers and to update the state bits. The other state bits from the ITU (bits [3:0] in the ITU) are ignored.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The invention described in this application may, of course, be embodied in hardware; e.g., within or coupled to a Central Processing Unit ("CPU"), microprocessor, microcontroller, System on Chip ("SOC"), or any other programmable device. Additionally, the invention may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. The invention embodied in software may be included in a semiconductor intellectual property core (e.g., embodied in HDL) and transformed to hardware in the production of integrated circuits. Additionally, invention as described herein may be embodied as a combination of hardware and software.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmuable gate arrays, optical, chemical, biological, quantum or nanoengineered systems, components and mechanisms may be used. In general, the functions of the present invention may be achieved by any means as is known in the art. Distributed, or networked systems, components and circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope of the present invention to implement a program or code that may be stored in a machine-readable medium or transmitted using a carrier wave to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The above-described arrangements of apparatus and methods are merely illustrative of applications of the principles of this invention and many other embodiments and modifications may be made without departing from the spirit and scope of the invention as defined in the claims.

These and other novel aspects of the present invention will be apparent to those of ordinary skill in the art upon review of the drawings and the remaining portions of the specification. Therefore, the scope of the invention is to be determined solely by the appended claims.

What is claimed is:

1. A memory interface for use with a multiprocess memory system having a gating memory, the gating memory associating one or more memory access method modifiers with each of a plurality of memory locations of the memory system wherein the gating memory returns a particular one access method modifier for a particular one memory location responsive to a memory access instruction relating to the particular one memory location including an operand identifying an access method, the interface comprising:

a request storage for storing a plurality of concurrent memory access instructions for one or more of the particular memory locations, each said memory access instruction issued from an associated independent thread context, wherein instruction issue from said associated independent thread context stops in response to said memory access instruction accessing the gating memory;

an arbiter, coupled to said request storage, for selecting a particular one of said memory access instructions to apply to the gating memory; and a controller, coupled to said request storage and to said arbiter, for:

storing said plurality of memory access instructions in said request storage;

initiating application of said particular one memory access instruction selected by said arbiter to the gating memory;

receiving the particular one access method modifier associated with said particular one memory location from the gating memory;

controlling access of the particular one memory location responsive to the access method using said particular one access method modifier, wherein instruction issue from the independent thread context associated with the particular one memory access instruction restarts in response to the controller responding that the gating memory completed access of the particular one memory location related by said one particular memory access instruction selected by said arbiter responsive to the access method;

wherein said arbiter periodically selects each of said memory access instructions from said request storage using an arbitration policy;

wherein the gating memory includes a control flag associated with at least one of the plurality of memory access method modifiers and wherein said controller modifies said arbitration policy responsive to said control flag.

2. The memory interface of claim 1 wherein said arbiter includes a first come first served (FCFS) policy in said arbitration policy in selecting any memory access instruction from said request storage.

3. The memory interface of claim 1 wherein each memory access instruction has an associated activity counter, each said associated activity counter is adjusted responsive to application of its associated memory access instruction to the gating storage.

4. The memory interface of claim 3 wherein said feat of said controller of initiating application of said particular one memory access instruction selected by said arbiter to the gating memory is a first operational mode of said controller, said controller including a second operational mode for treatment of a particular one memory access instruction when a value of the activity counter of said particular one memory access instruction has a particular relationship to a predetermined threshold.

5. The memory interface of claim 4 wherein said second operational mode includes an abort operation for said particular one memory access instruction that removes said particular one memory access instruction from said request storage.

6. The memory interface of claim 5 wherein said second operational mode includes a communication of the abort operation to said thread context associated with said particular one access instruction.

7. The memory interface of claim 1 wherein the gating storage includes a control flag associated with at least one of the plurality of memory access method modifiers and wherein said controller is responsive to said control flag.

8. The memory interface of claim 3 wherein the gating storage includes a control flag associated with at least one of the plurality of memory access method modifiers and wherein said controller modifies said activity counter responsive to said control flag.

9. The memory interface of claim 4 wherein the gating storage includes a control flag associated with at least one of the plurality of memory access method modifiers and wherein said controller modifies said value responsive to said control flag.

10. The memory interface of claim 4 wherein the gating storage includes a control flag associated with at least one of the plurality of memory access method modifiers and wherein said controller modifies said threshold responsive to said control flag.

11. The memory interface of claim 4 wherein the gating storage includes a control flag associated with at least one of the plurality of memory access method modifiers and wherein said controller modifies said second operational mode responsive to said control flag.

12. The memory interface of claim 1 wherein said controller, responsive to an abort signal from a specific one of said thread contexts issuing a particular one of said memory access instructions, for initiating a status communication to said specific one thread context indicating whether said particular one memory access instruction has been executed.

13. The memory interface of claim 1 wherein the gating memory includes two or more memory access method modifiers for each associated memory location and the gating memory is responsive to said particular one memory access instruction for communicating a particular one of the two or more memory access method modifiers to said controller, said controller responsive to said particular one memory access method modifiers to modify one or more of its operational activities.

14. The memory interface of claim 1 wherein the gating memory includes two or more memory access method modifiers for each associated memory location and the gating memory is responsive to said particular one memory access instruction for communicating a particular one of the two or more memory access method modifiers to said controller and wherein said controller modifies said arbitration policy responsive to said particular one memory access method modifiers.

15. The memory interface of claim 3 wherein the gating memory includes two or more memory access method modifiers for each associated memory location and the gating memory is responsive to said particular one memory access instruction for communicating a particular one of the two or more memory access method modifiers to said controller and wherein said controller modifies said activity counter responsive to said particular one memory access method modifier.

16. The memory interface of claim 4 wherein the gating memory includes two or more memory access method modifiers for each associated memory location and the gating memory is responsive to said particular one memory access instruction for communicating a particular one of the two or more memory access method modifiers to said controller and wherein said controller modifies said value responsive to said particular one memory access method modifier.

17. The memory interface of claim 4 wherein the gating memory includes two or more memory access method modifiers for each associated memory location and the gating memory is responsive to said particular one memory access instruction for communicating a particular one of the two or more memory access method modifiers to said controller and wherein said controller modifies said threshold responsive to said particular one memory access method modifier.

18. The memory interface of claim 4 wherein the gating memory includes two or more memory access method modifiers for each associated memory location and the gating memory is responsive to said particular one memory access instruction for communicating a particular one of the two or more memory access method modifiers to said controller and wherein said controller modifies said second operational mode responsive to said particular one memory access method modifier.

19. The memory interface of claim 1 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller, said controller responsive to one or more of said control flag and said particular one memory access method modifier to modify one or more of its operational activities.

20. The memory interface of claim 1 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller and wherein said controller modifies said arbitration policy responsive to one or more of said control flag and said particular one memory access method modifier.

21. The memory interface of claim 3 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller and wherein said controller modifies said activity counter responsive to one or more of said control flag and said particular one memory access method modifier.

22. The memory interface of claim 4 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller and wherein said controller modifies said value responsive to one or more of said control flag and said particular one memory access method modifier.

23. The memory interface of claim 4 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller and wherein said controller modifies said threshold responsive to one or more of said control flag and said particular one memory access method modifier.

24. The memory interface of claim 4 wherein the gating memory includes both a control flag associated with at least one of the plurality of memory access method modifiers and two or more memory access method modifiers for each associated memory location and the gating memory is responsive to said particular one memory access instruction for communicating a particular one of the two or more memory access method modifiers and its associated control flag to said controller and wherein said controller modifies said second operational mode responsive to one or more of said control flag and said particular one memory access method modifier.

25. The memory interface of claim 24 wherein said controller, responsive to an interrupt signal from a specific one of said thread contexts issuing a particular one of said memory access instructions, for initiating a status communication to said specific one thread context indicating whether said particular one memory access instruction has been executed.

26. A memory access method, the method comprising:
a) storing a plurality of concurrent memory access instructions for one or more particular memory locations, each of said memory access instructions issued from an associated independent thread context and each of said particular memory locations part of a multiprocess memory system including a gating memory, said gating memory associating one or more memory access method modifiers with each of a plurality of memory locations of the memory system wherein said gating memory returns a said particular one access method modifier for a particular one memory location responsive to a memory access instruction relating to said particular one memory location including an operand identifying an access method, wherein instruction issue from said associated independent thread context stops in response to said memory access instruction accessing the gating memory, wherein each said memory access instruction has an associated activity counter, wherein said gating memory includes a control flag associated with at least one of the plurality of memory access method modifiers;
b) selecting a particular one of said memory access instructions to apply to said gating memory;
c) initiating application of said particular one memory access instruction selected by said arbiter to the gating memory;
d) receiving the particular one access method modifier associated with said particular one memory location from the gating memory;
e) controlling access of the particular one memory location responsive to said access method using said particular one access method modifier, wherein instruction issue from the independent thread context associated with the particular one memory access instruction restarts in response to the controller responding that the gating memory completed access of the particular one memory location related by said one particular memory access instruction selected by said arbiter responsive to the access method;
f) adjusting an associated activity counter responsive to application of its associated memory access instruction to said gating memory; and
g) modifying said activity counter, responsive to said control flag, when said particular one access method modifier is received.

27. The memory access method of claim 26 wherein said selecting feat selects each of said memory access instructions from said request storage using an arbitration policy.

28. The memory access method of claim 26 wherein said feat of initiating application of said particular one memory access instruction is a first operational mode, the method further comprising a second operational mode processing a particular one memory access instruction when a value of said activity counter of said particular one memory access instruction has a particular relationship to a predetermined threshold.

29. The memory access method of claim 28 wherein said storing feat stores said plurality of concurrent memory access instructions in a request storage and wherein said second operational mode includes aborting said particular one memory access instruction including removing said particular one memory access instruction from said request storage.

30. The memory access method of claim 29 wherein said second operational mode includes communicating said abort operation to a thread context associated with said particular one access instruction.

31. The memory access method of claim 26 wherein said gating storage includes a control flag associated with at least one of the plurality of memory access method modifiers, the method further comprising responding to said control flag when said particular one access method modifier is received.

32. The memory access method of claim 28 wherein said gating storage includes a control flag associated with at least one of the plurality of memory access method modifiers, the method further comprising modifying said value, responsive to said control flag, when said particular one access method modifier is received.

33. The memory access method of claim 28 wherein said gating storage includes a control flag associated with at least one of the plurality of memory access method modifiers, the method further comprising modifying said threshold, responsive to said control flag, when said particular one access method modifier is received.

34. The memory access method of claim 28 wherein said gating storage includes a control flag associated with at least one of the plurality of memory access method modifiers, the method further comprising modifying said second operational mode, responsive to said control flag, when said particular one access method modifier is received.

35. The memory access method of claim 26 further comprising:
   initiating, responsive to an interrupt signal from a specific one of said thread contexts issuing a particular one of said memory access instructions, a status communication to said specific one thread context indicating whether said particular one memory access instruction has been executed.

36. The memory access method of claim 26 wherein said gating memory includes two or more memory access method modifiers for each associated memory location and said gating memory is responsive to said particular one memory access instruction for communicating a particular one of the two or more memory access method modifiers to said controller, the method further comprising modifying, responsive to said particular one memory access method modifier, one or more operational activities of the method.

37. A memory interface for use with a multiprocess memory system having a gating memory, the gating memory associating one or more memory access method modifiers with each of a plurality of memory locations of the memory system wherein the gating memory returns a particular one access method modifier for a particular one memory location responsive to a memory access instruction relating to the particular one memory location including an operand identifying an access method, the interface comprising:
   a request storage for storing a plurality of concurrent memory access instructions for one or more of the particular memory locations, each said memory access instruction issued from an associated independent thread context, wherein instruction issue from said associated independent thread context stops in response to said memory access instruction accessing the gating memory;
   an arbiter, coupled to said request storage, for selecting a particular one of said memory access instructions to apply to the gating memory; and
   a controller, coupled to said request storage and to said arbiter, for:
      storing said plurality of memory access instructions in said request storage;
      initiating application of said particular one memory access instruction selected by said arbiter to the gating memory;
      receiving the particular one access method modifier associated with said particular one memory location from the gating memory; and
      controlling access of the particular one memory location responsive to the access method using said particular one access method modifier, wherein instruction issue from the independent thread context associated with the particular one memory access instruction restarts in response to the controller responding that the gating memory completed access of the particular one memory location related by said one particular memory access instruction selected by said arbiter responsive to the access method;
   wherein each memory access instruction has an associated activity counter, each said associated activity counter is adjusted responsive to application of its associated memory access instruction to the gating storage;
   wherein the gating storage includes a control flag associated with at least one of the plurality of memory access method modifiers and wherein said controller modifies said activity counter responsive to said control flag.

38. The memory interface of claim 37 wherein said arbiter periodically selects each of said memory access instructions from said request storage using an arbitration policy.

39. The memory interface of claim 37 wherein the gating storage includes a control flag associated with at least one of the plurality of memory access method modifiers and wherein said controller is responsive to said control flag.

40. The memory interface of claim 37 wherein said controller, responsive to an abort signal from a specific one of said thread contexts issuing a particular one of said memory access instructions, for initiating a status communication to said specific one thread context indicating whether said particular one memory access instruction has been executed.

41. The memory interface of claim 37 wherein the gating memory includes two or more memory access method modifiers for each associated memory location and the gating memory is responsive to said particular one memory access instruction for communicating a particular one of the two or more memory access method modifiers to said controller, said controller responsive to said particular one memory access method modifiers to modify one or more of its operational activities.

42. The memory interface of claim 37 wherein the gating memory includes two or more memory access method modifiers for each associated memory location and the gating memory is responsive to said particular one memory access instruction for communicating a particular one of the two or more memory access method modifiers to said controller and wherein said controller modifies said activity counter responsive to said particular one memory access method modifier.

43. The memory interface of claim 37 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller, said controller responsive to one or more of said control flag and said particular one memory access method modifier to modify one or more of its operational activities.

44. A memory interface for use with a multiprocess memory system having a gating memory, the gating memory associating one or more memory access method modifiers with each of a plurality of memory locations of the memory system wherein the gating memory returns a particular one access method modifier for a particular one memory location responsive to a memory access instruction relating to the particular one memory location including an operand identifying an access method, the interface comprising:
   a request storage for storing a plurality of concurrent memory access instructions for one or more of the particular memory locations, each said memory access instruction issued from an associated independent thread context, wherein instruction issue from said associated independent thread context stops in response to said memory access instruction accessing the gating memory;
   an arbiter, coupled to said request storage, for selecting a particular one of said memory access instructions to apply to the gating memory; and
   a controller, coupled to said request storage and to said arbiter, for:
      storing said plurality of memory access instructions in said request storage;

initiating application of said particular one memory access instruction selected by said arbiter to the gating memory;

receiving the particular one access method modifier associated with said particular one memory location from the gating memory; and controlling access of the particular one memory location responsive to the access method using said particular one access method modifier, wherein instruction issue from the independent thread context associated with the particular one memory access instruction restarts in response to the controller responding that the gating memory completed access of the particular one memory location related by said one particular memory access instruction selected by said arbiter responsive to the access method;

wherein said arbiter periodically selects each of said memory access instructions from said request storage using an arbitration policy;

wherein the gating memory includes two or more memory access method modifiers for each associated memory location and the gating memory is responsive to said particular one memory access instruction for communicating a particular one of the two or more memory access method modifiers to said controller and wherein said controller modifies said arbitration policy responsive to said particular one memory access method modifiers.

45. The memory interface of claim 44 wherein each memory access instruction has an associated activity counter, each said associated activity counter is adjusted responsive to application of its associated memory access instruction to the gating storage.

46. The memory interface of claim 44 wherein the gating storage includes a control flag associated with at least one of the plurality of memory access method modifiers and wherein said controller is responsive to said control flag.

47. The memory interface of claim 44 wherein said controller, responsive to an abort signal from a specific one of said thread contexts issuing a particular one of said memory access instructions, for initiating a status communication to said specific one thread context indicating whether said particular one memory access instruction has been executed.

48. The memory interface of claim 44 wherein the gating memory includes two or more memory access method modifiers for each associated memory location and the gating memory is responsive to said particular one memory access instruction for communicating a particular one of the two or more memory access method modifiers to said controller, said controller responsive to said particular one memory access method modifiers to modify one or more of its operational activities.

49. The memory interface of claim 44 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller and wherein said controller modifies said arbitration policy responsive to one or more of said control flag and said particular one memory access method modifier.

50. The memory interface of claim 44 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller, said controller responsive to one or more of said control flag and said particular one memory access method modifier to modify one or more of its operational activities.

51. A memory interface for use with a multiprocess memory system having a gating memory, the gating memory associating one or more memory access method modifiers with each of a plurality of memory locations of the memory system wherein the gating memory returns a particular one access method modifier for a particular one memory location responsive to a memory access instruction relating to the particular one memory location including an operand identifying an access method, the interface comprising:

a request storage for storing a plurality of concurrent memory access instructions for one or more of the particular memory locations, each said memory access instruction issued from an associated independent thread context, wherein instruction issue from said associated independent thread context stops in response to said memory access instruction accessing the gating memory;

an arbiter, coupled to said request storage, for selecting a particular one of said memory access instructions to apply to the gating memory; and a controller, coupled to said request storage and to said arbiter, for:

storing said plurality of memory access instructions in said request storage;

initiating application of said particular one memory access instruction selected by said arbiter to the gating memory;

receiving the particular one access method modifier associated with said particular one memory location from the gating memory; and controlling access of the particular one memory location responsive to the access method using said particular one access method modifier, wherein instruction issue from the independent thread context associated with the particular one memory access instruction restarts in response to the controller responding that the gating memory completed access of the particular one memory location related by said one particular memory access instruction selected by said arbiter responsive to the access method;

wherein each memory access instruction has an associated activity counter, each said associated activity counter is adjusted responsive to application of its associated memory access instruction to the gating storage;

wherein the gating memory includes two or more memory access method modifiers for each associated memory location and the gating memory is responsive to said particular one memory access instruction for communicating a particular one of the two or more memory access method modifiers to said controller and wherein said controller modifies said activity counter responsive to said particular one memory access method modifier.

52. The memory interface of claim 51 wherein said arbiter periodically selects each of said memory access instructions from said request storage using an arbitration policy.

53. The memory interface of claim 51 wherein the gating storage includes a control flag associated with at least one of the plurality of memory access method modifiers and wherein said controller is responsive to said control flag.

54. The memory interface of claim 51 wherein said controller, responsive to an abort signal from a specific one of said thread contexts issuing a particular one of said memory access instructions, for initiating a status communication to said specific one thread context indicating whether said particular one memory access instruction has been executed.

55. The memory interface of claim 51 wherein the gating memory includes two or more memory access method modifiers for each associated memory location and the gating memory is responsive to said particular one memory access instruction for communicating a particular one of the two or more memory access method modifiers to said controller, said controller responsive to said particular one memory access method modifiers to modify one or more of its operational activities.

56. The memory interface of claim 51 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller and wherein said controller modifies said activity counter responsive to one or more of said control flag and said particular one memory access method modifier.

57. The memory interface of claim 51 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller, said controller responsive to one or more of said control flag and said particular one memory access method modifier to modify one or more of its operational activities.

58. A memory interface for use with a multiprocess memory system having a gating memory, the gating memory associating one or more memory access method modifiers with each of a plurality of memory locations of the memory system wherein the gating memory returns a particular one access method modifier for a particular one memory location responsive to a memory access instruction relating to the particular one memory location including an operand identifying an access method, the interface comprising:

a request storage for storing a plurality of concurrent memory access instructions for one or more of the particular memory locations, each said memory access instruction issued from an associated independent thread context, wherein instruction issue from said associated independent thread context stops in response to said memory access instruction accessing the gating memory;

an arbiter, coupled to said request storage, for selecting a particular one of said memory access instructions to apply to the gating memory; and a controller, coupled to said request storage and to said arbiter, for:

storing said plurality of memory access instructions in said request storage;

initiating application of said particular one memory access instruction selected by said arbiter to the gating memory;

receiving the particular one access method modifier associated with said particular one memory location from the gating memory; and controlling access of the particular one memory location responsive to the access method using said particular one access method modifier, wherein instruction issue from the independent thread context associated with the particular one memory access instruction restarts in response to the controller responding that the gating memory completed access of the particular one memory location related by said one particular memory access instruction selected by said arbiter responsive to the access method;

wherein said arbiter periodically selects each of said memory access instructions from said request storage using an arbitration policy;

wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller and wherein said controller modifies said arbitration policy responsive to one or more of said control flag and said particular one memory access method modifier.

59. The memory interface of claim 58 wherein each memory access instruction has an associated activity counter, each said associated activity counter is adjusted responsive to application of its associated memory access instruction to the gating storage.

60. The memory interface of claim 58 wherein the gating storage includes a control flag associated with at least one of the plurality of memory access method modifiers and wherein said controller is responsive to said control flag.

61. The memory interface of claim 58 wherein said controller, responsive to an abort signal from a specific one of said thread contexts issuing a particular one of said memory access instructions, for initiating a status communication to said specific one thread context indicating whether said particular one memory access instruction has been executed.

62. The memory interface of claim 58 wherein the gating memory includes two or more memory access method modifiers for each associated memory location and the gating memory is responsive to said particular one memory access instruction for communicating a particular one of the two or more memory access method modifiers to said controller, said controller responsive to said particular one memory access method modifiers to modify one or more of its operational activities.

63. The memory interface of claim 58 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller, said controller responsive to one or more of said control flag and said particular one memory access method modifier to modify one or more of its operational activities.

64. A memory interface for use with a multiprocess memory system having a gating memory, the gating memory associating one or more memory access method modifiers with each of a plurality of memory locations of the memory system wherein the gating memory returns a particular one access method modifier for a particular one memory location responsive to a memory access instruction relating to the particular one memory location including an operand identifying an access method, the interface comprising:

a request storage for storing a plurality of concurrent memory access instructions for one or more of the particular memory locations, each said memory access instruction issued from an associated independent thread context, wherein instruction issue from said associated independent thread context stops in response to said memory access instruction accessing the gating memory;

an arbiter, coupled to said request storage, for selecting a particular one of said memory access instructions to apply to the gating memory; and a controller, coupled to said request storage and to said arbiter, for:

storing said plurality of memory access instructions in said request storage;

initiating application of said particular one memory access instruction selected by said arbiter to the gating memory;

receiving the particular one access method modifier associated with said particular one memory location from the gating memory; and controlling access of the particular one memory location responsive to the access method using said particular one access method modifier, wherein instruction issue from the independent thread context associated with the particular one memory access instruction restarts in response to the controller responding that the gating memory completed access of the particular one memory location related by said one particular memory access instruction selected by said arbiter responsive to the access method;

wherein each memory access instruction has an associated activity counter, each said associated activity counter is adjusted responsive to application of its associated memory access instruction to the gating storage;

wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller and wherein said controller modifies said activity counter responsive to one or more of said control flag and said particular one memory access method modifier.

65. The memory interface of claim 64 wherein said arbiter periodically selects each of said memory access instructions from said request storage using an arbitration policy.

66. The memory interface of claim 64 wherein the gating storage includes a control flag associated with at least one of the plurality of memory access method modifiers and wherein said controller is responsive to said control flag.

67. The memory interface of claim 64 wherein said controller, responsive to an abort signal from a specific one of said thread contexts issuing a particular one of said memory access instructions, for initiating a status communication to said specific one thread context indicating whether said particular one memory access instruction has been executed.

68. The memory interface of claim 64 wherein the gating memory includes two or more memory access method modifiers for each associated memory location and the gating memory is responsive to said particular one memory access instruction for communicating a particular one of the two or more memory access method modifiers to said controller, said controller responsive to said particular one memory access method modifiers to modify one or more of its operational activities.

69. The memory interface of claim 64 wherein the gating memory includes both a control flag associated with at least one of the plurality of memory access method modifiers and two or more memory access method modifiers for each associated memory location with the gating memory responsive to said particular one memory access instruction for communicating a particular one of the two or more memory access method modifiers and its associated control flag to said controller, said controller responsive to one or more of said control flag and said particular one memory access method modifier to modify one or more of its operational activities.

* * * * *